United States Patent [19]
Hunt et al.

[11] Patent Number: 5,729,678
[45] Date of Patent: Mar. 17, 1998

[54] BUS MONITOR SYSTEM

[75] Inventors: Jeffrey Glenn Hunt, Glendale; Thomas Jay Perry, Phoenix; Michael Gilbert, Glendale; Randall Lew Brown, Phoenix; James B. Southway, Jr., Glendale, all of Ariz.

[73] Assignee: AG Communication Systems Corporation, Phoenix, Ariz.

[21] Appl. No.: 611,984

[22] Filed: Mar. 4, 1996

[51] Int. Cl.$^6$ .................................................. G06F 11/00
[52] U.S. Cl. ............................................... 395/183.19
[58] Field of Search ............................. 395/183.01, 183.16, 395/183.19, 473, 835, 306; 364/264

[56] References Cited

U.S. PATENT DOCUMENTS

| | | |
|---|---|---|
| 4,453,211 | 6/1984 | Askinazi et al. . |
| 5,426,741 | 6/1995 | Butts, Jr. et al. . |
| 5,471,462 | 11/1995 | Amador ........................... 370/17 |

FOREIGN PATENT DOCUMENTS

| | | | |
|---|---|---|---|
| 57-037382 | 3/1982 | Japan ................ | G06F 3/00 |
| 1-184992 | 7/1989 | Japan ................ | H04L 3/14 |
| 3-014964 | 1/1991 | Japan ................ | H04L 12/48 |

*Primary Examiner*—Albert DeCady
*Attorney, Agent, or Firm*—David J. Zwick; Gregory G. Hendricks

[57] ABSTRACT

A bus monitor system comprises eight identical programmable monitor circuits that are each connected to a monitored bus and to a local 16-bit event bus. There are three interfaces to the event bus within each monitor circuit. One interface asserts a predetermined bit pattern on the event bus when match conditions occur between bit patterns on the monitored bus and predetermined bit patterns stored in monitor circuit registers. A second interface asserts a signal on an external pin when bit patterns on the event bus match a predetermined bit pattern stored in a monitor circuit register. A third interface asserts a predetermined bit pattern on the event bus when an external device has asserted a signal on an external pin. Each monitor circuit is capable of reading and asserting any of the bits of the event bus. The event bus is used to enable or disable monitor circuit interfaces. If any asserted bit on the event bus matches a corresponding bit of one of the predetermined bit patterns stored in the interface enable and disable registers, that interface will be enabled or disabled, respectively. The event bus gives the monitor system the ability to simultaneously monitor for multiple bit patterns on the monitored bus, and to monitor for a sequence of bit patterns by having one monitor circuit trigger another.

7 Claims, 19 Drawing Sheets

BUS MONITOR SYSTEM

FIELD OF THE INVENTION

The present invention relates to bus monitor systems and more particularly to a system that contains eight monitor circuits that communicate with each other over a local event bus.

BACKGROUND OF THE INVENTION

Bus monitor systems are used to monitor real-time activity on, for example, processor busses and signal the occurrence of predetermined patterns of information on the processor bus. Prior art monitor systems are generally directed to serial communications. Serial line monitors are well established in industry and can have sophisticated user interfaces and capabilities including user entered software control of monitor operations. The nature of serial communications allows these monitor systems to perform comparisons and other monitor operations during the time that serial bits are buffered to form channel words and other data structures. In contrast, information on a parallel bus may be such that there are no processor cycles between the strobing of one bit pattern onto the bus and the next in which to perform monitor operations. Consequently, there is a need for a monitor system directed to parallel data busses, such as those associated with high speed data processing systems, that can perform fast, complex comparison testing and condition handling.

Accordingly, it is an object of the present invention to provide a programmable monitor system capable of very fast complex comparisons of parallel bus information.

SUMMARY OF THE INVENTION

The present invention is a bus monitor system that monitors a 64-bit bus and provides indications if predetermined bit patterns are detected on the monitored bus. A microprocessor stores predetermined bit patterns into monitor registers which are then used in comparisons to bit patterns on the various components of the monitored bus.

The bus monitor system comprises eight identical monitor circuits that are connected to a local 16-bit "event bus." Each monitor circuit has the capability of reading and asserting any of the bits of the event bus. There are three interfaces to the event bus within each monitor circuit. One interface asserts a predetermined bit pattern on the event bus when match conditions occur between bit patterns on the monitored bus and predetermined bit patterns stored in monitor circuit registers. A second interface asserts a signal on an external pin when bit patterns on the event bus match a predetermined bit pattern stored in a monitor circuit register. A third interface asserts a predetermined bit pattern on the event bus when an external device has asserted a signal on an external pin.

The event bus is used to enable or disable monitor circuit interfaces. If any asserted bit on the event bus matches a corresponding bit of one of the predetermined bit patterns stored in the interface enable and disable registers, that interface will be enabled or disabled, respectively.

The event bus gives the monitor system the ability to simultaneously monitor for multiple bit patterns on the monitored bus, and to monitor for a sequence of bit patterns by having one monitor circuit trigger another.

DESCRIPTION OF THE PREFERRED EMBODIMENT

Figure 1:
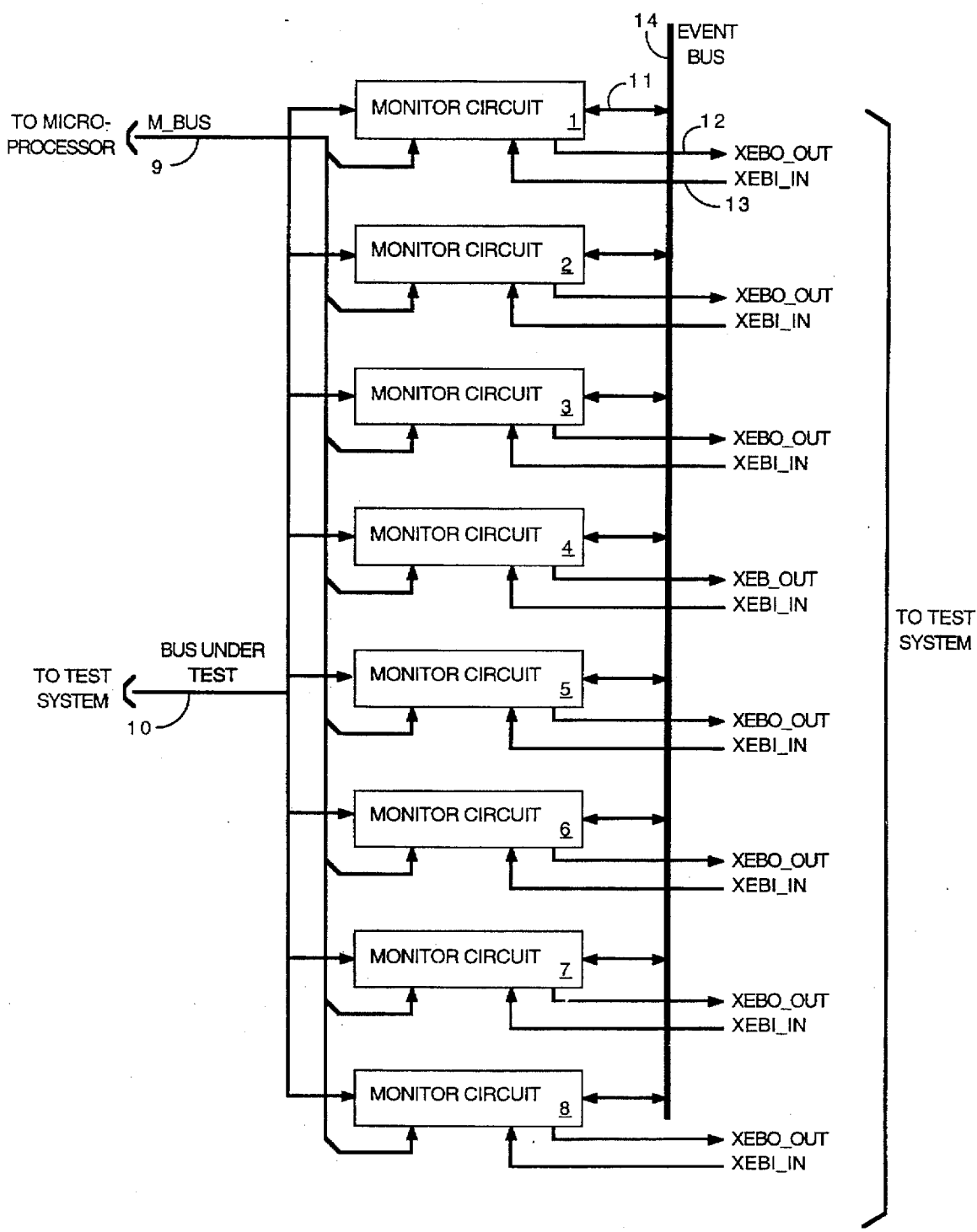
FIG. 1 is a block diagram showing the overall bus monitor system.

FIG. 1 illustrates a block diagram of the bus monitor system. Monitor circuits 1–8 are each connected to monitored bus 10 from the test system, and to microprocessor bus 9. Each monitor circuit is also connected to event bus 14 over leads 11, and each monitor circuit provides signals XEBO_OUT to the test system and receives signal XEBI_IN from the test system over leads 12 and 13, respectively.

The microprocessor communicates with the individual monitor circuits 1–8 over microprocessor bus 9 and programs the individual bus monitor circuits 1–8 by writing predetermined bit patterns and control information into various registers within each monitor circuit. Monitor circuits 1–8 monitor for occurrences of predetermined bit patterns on the monitored bus be and other enabling conditions as programmed by the microprocessor.

A monitor circuit can assert a predetermined bit pattern onto event bus 14 over lead 11 when match conditions occur between bit patterns on monitored bus 10 and predetermined bit patterns stored in monitor circuit registers. Signals on event bus 11 are used to cause various subcomponents located within monitor circuits 1–8 to become enabled or disabled.

A monitor circuit communicates to the test system via signals XEBO_OUT and XEBI_IN over leads 12 and 13, respectively, each of said leads being connected to external pins. The monitor circuit can assert signal XEBO_OUT if any asserted bit on the event bus matches a corresponding bit of the associated predetermined bit pattern stored in the monitor circuit registers. The test system can cause a predetermined bit pattern stored in a monitor circuit register to be written onto event bus 14 by asserting signal XEBI_IN on lead 13.

Figure 2:
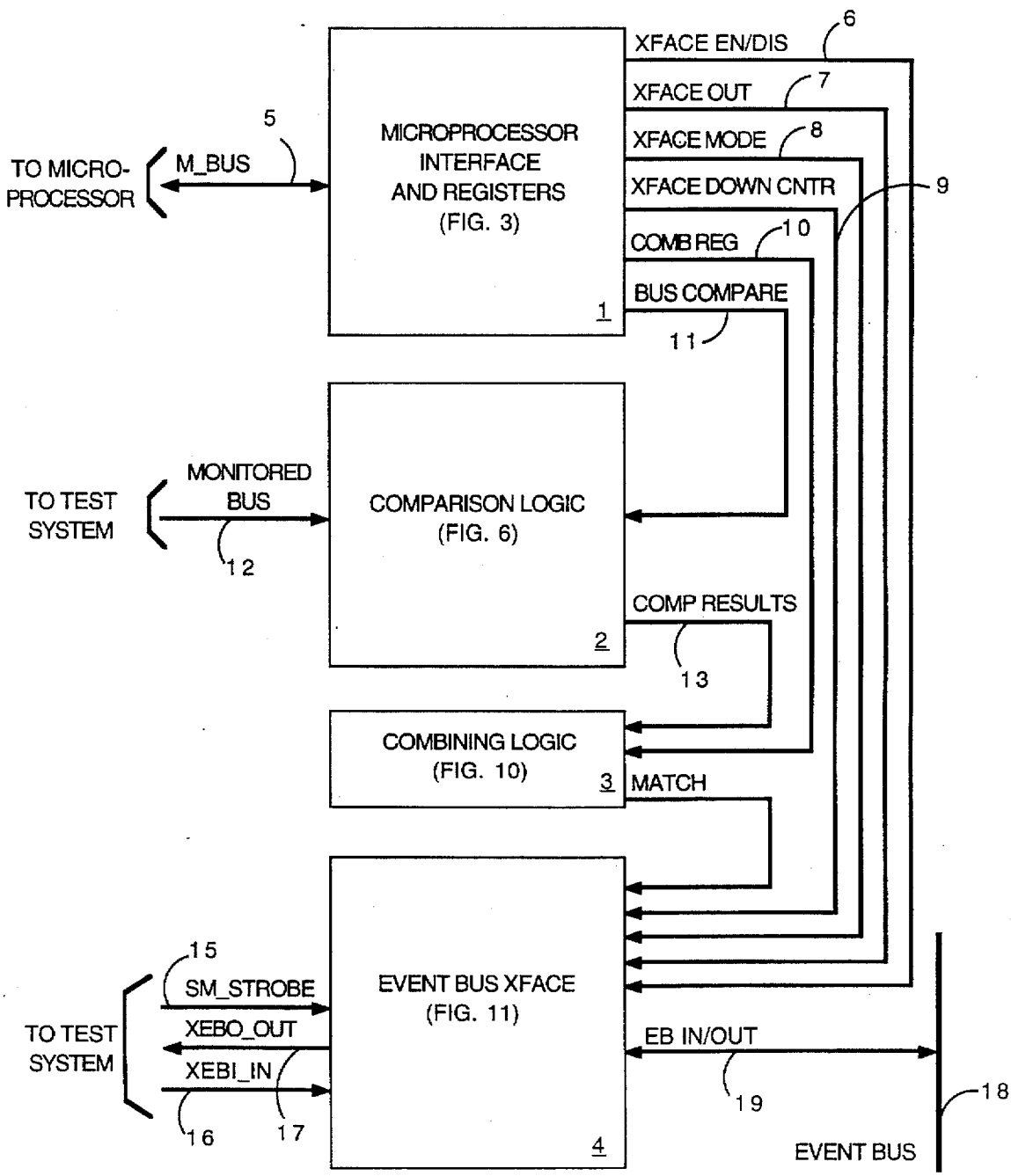
FIG. 2 is a block diagram showing the components of an individual bus monitor circuit.

As shown in FIG. 2, each monitor circuit comprises four major components: microprocessor interface and registers component 1; comparison logic component 2; combining logic component 3; and event bus xface component 4.

Microprocessor interface and registers component 1 is connected to the microprocessor bus over lead 5, and provides signal XFACE EN/DIS on lead 6, signal XFACE OUT on lead 7, signal XFACE MODE on lead 8 and signal XFACE DOWN CNTR on lead 9, all to event bus xface component 4, signal COMB REG on lead 10 to combining logic component 3, and signal BUS COMPARE on lead 11 to comparison logic component 2.

Comparison logic component 2 is connected to the monitored bus over lead 12 and provides signal COMP RESULTS on lead 13 to combining logic component 3.

Combining logic component 3 provides signal MATCH on lead 14 to event bus xface component 4.

Event bus xface component 4 receives signals SM_STROBE and XEBI_IN on leads 15 and 16, respectively, from the test system, provides signal XEBO_OUT on lead 17 to the test system, and is connected to event bus 18 over lead 19.

An overview of the operation of a single monitor circuit is as follows. The microprocessor loads monitor registers via the microprocessor bus over lead 5 that are located in microprocessor interface and registers component 1 with predetermined bit patterns and control information.

Signal XFACE EN/DIS on lead 6 is connected to six registers that contain predetermined bit patterns that control the enabling and disabling of the three subcomponents of event bus xface component 4, each of the three subcomponents being associated with one enabling register and one disabling register. The enabling and disabling predetermined bit patterns are compared to signals on event bus 18 and if any corresponding bits between the predetermined bit patterns and the event bus are both asserted, the associated event bus xface subcomponent will be enabled or disabled, depending on which register had an asserted bit corresponding to an asserted bit on event bus 18.

Signal XFACE OUT on lead 7 is connected to two registers that contain predetermined bit patterns that are asserted on event bus 18 by the two subcomponents of event bus xface component 4 that can write to event bus Signal XFACE MODE on lead 8 is connected to three registers that contain control information that is used by the three subcomponents of event bus xface component 4. This control information determines whether the event bus will be considered active-high or active-low for purposes of comparisons to the enable and disable registers, whether certain events occur synchronously with external synchronization signal SM_STROBE on lead 15, and whether subcomponents of event bus xface component 4 are forced enabled or forced disabled.

Signal XFACE DOWN CNTR on lead 9 is connected to three down counters that can be used to cause event bus xface subcomponent output functions to occur on the "n'th" occurrence of the simultaneous occurrence of all enabling conditions. Each of the three subcomponents of event bus xface component 4 has a down counter that is decremented down to zero by one at the simultaneous occurrence of all enabling conditions and the strobing of the external synchronization signal. An event bus xface subcomponent will perform its normal output function only when all enabling conditions are met and the associated down counter contains zero.

Signal COMB REG on lead 10 is connected to a register that is used to determine whether the desired bit pattern on the monitored bus was detected.

Signal BUS COMPARE on lead 11 is connected to 12 registers that contain bit patterns that are compared to the components of the monitored bus (i.e., data, address, page, unit and control). Seven of the 12 registers contain bit patterns that are compared directly to the monitored bus. The other five registers contain masks that indicate which bits on the monitored bus to ignore during the aforementioned compares.

After the microprocessor has loaded the monitor registers with predetermined bit patterns and control information, the test system then asserts signal XEBI_IN on lead 16 to cause one of the three subcomponents of event bus xface component 4 to assert a predetermined bit pattern on event bus 18. This predetermined bit pattern is used to enable another of the event bus xface subcomponents that monitors for the occurrence of a desired bit pattern on the monitored bus.

Comparison logic component 2 and combining logic component 3 determine if the desired bit pattern on the monitored bus has occurred. Comparison logic component 2 performs five comparison tests between the components of the monitored bus and predetermined bit patterns stored in the monitor circuit registers accessed by lead 11 that are associated with those monitored bus components and communicates the results of the comparisons to combining logic component 5 with signal COMP RESULTS on lead 13. Combining logic component 5 will assert signal MATCH on lead 14 if the desired comparisons yielded positive results.

Signal MATCH on lead 14 causes the event bus xface subcomponent that monitors for the occurrence of a desired bit pattern on the monitored bus to assert a predetermined bit pattern on event bus 19. This predetermined bit pattern is used to enable the last of the event bus xface subcomponents that asserts signal XEBO_OUT on lead 17 thereby signaling to the test system that the desired bit pattern was detected on the monitored bus.

Multiple monitor circuits can be used to monitor for a series of monitored bus bit patterns by having one monitor circuit enable another monitor circuit. The predetermined bit pattern that is asserted on event bus 18 by the event bus xface subcomponent that monitors for the occurrence of a desired bit pattern on the monitored bus can be used to enable the same event bus xface subcomponent in another of the eight monitor circuits that comprise the monitor system.

Multiple monitor circuits can be used to monitor for up to eight monitored bus bit patterns simultaneously. The predetermined bit pattern that is asserted on event bus 18 by the event bus xface subcomponent that responds to signal XEBI_IN on lead 16 from the test system can be used to enable the event bus xface subcomponent that monitors for the occurrence of a desired bit pattern on the monitored bus in multiple monitor circuits of the monitor system.

Figure 3:
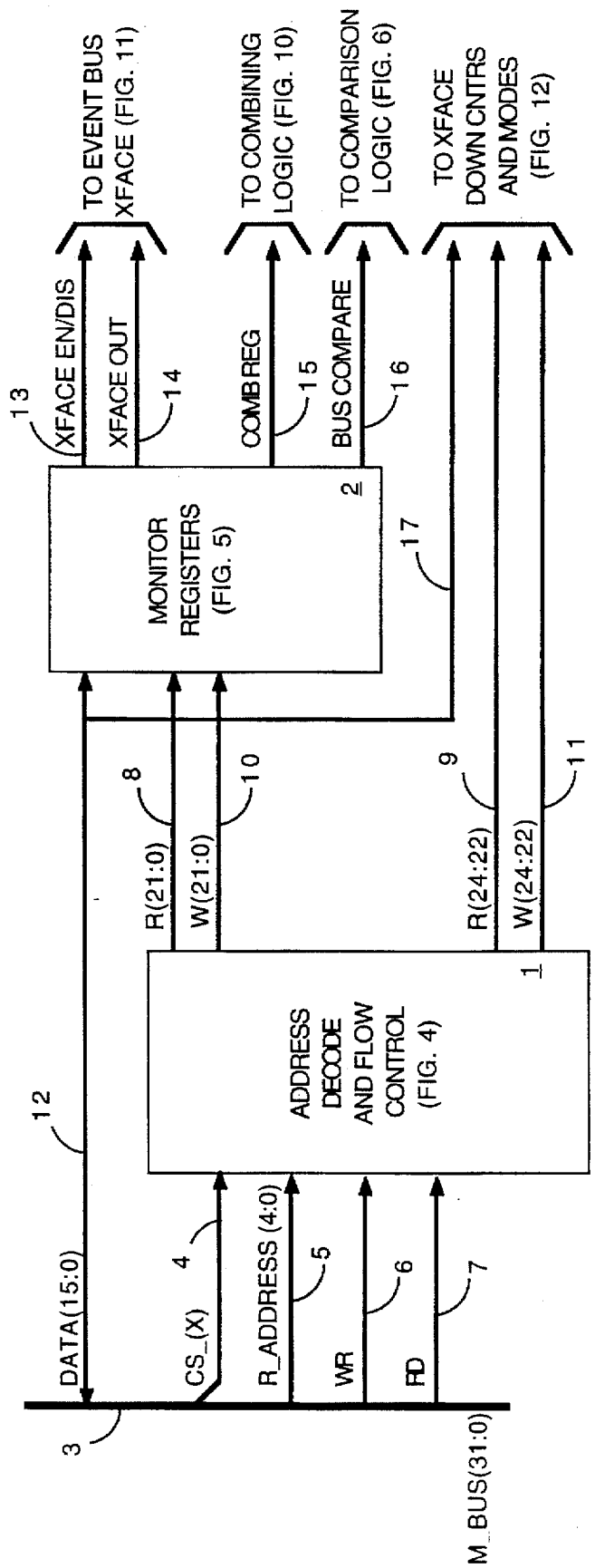
FIG. 3 is a block diagram showing the microprocessor interface and registers component.

FIG. 3 illustrates the major subcomponents of the microprocessor interface and registers component 1 of FIG. 2.

This component operates to write data to or read data from the 25 registers of a monitor circuit. The microprocessor interface and registers component comprises an address decode and flow control subcomponent 1 and a monitor registers subcomponent 2. A description of all monitor circuit registers is located in Appendix 1.

Address decode and flow control subcomponent 1 receives from microprocessor bus 3 the following signals: circuit select signal CS(X) on lead 4, register address signal R_ADDRESS on five-lead connection 5, write-to-register signal WR on lead 6 and read-from-register signal RD on lead 7. Address decode and flow control subcomponent 1 transmits 25 directed-register-read-from signals R(24:0) over leads 8 and 9, and 25 directed-register-write-to signals W(24:0) over leads 10 and Signals R(21:0) and W(21:0) on leads 8 and 10, respectively, are connected to the 22 monitor circuit registers located in monitor registers component 2. Signals R(24:22) and W(24:22) on leads 9 and 11, respectively, are connected to the three monitor circuit registers located in another component of the monitor circuit.

Monitor registers subcomponent 2 further receives signal DATA on lead 12 from microprocessor bus 3, and transmits signals XFACE EN/DIS on lead 13, signal XFACE OUT on lead 14, signal COMB REG on lead 15 and signal BUS COMPARE on lead 16. Signal DATA is also connected to the three monitor circuit registers located in the other component of the monitor circuit over lead 17.

Internal to monitor registers subcomponent 2, DATA lead 12 is configured as a two-path bi-directional bus to which all monitor circuit registers are connected. One bus path is used in write-to-register operations and the other bus path is used in read-from-register operations.

Microprocessor bus 3 consists of 31 leads of which the 16 data leads over connection 12, the five register address leads over connection 5 and the write-to-register and read-from-register leads 6 and 7 are common to all monitor circuits. The remaining eight leads carry circuit select signals CS(X) with a separate lead connected to each of the eight monitor circuits over connections 4.

In operation, the microprocessor asserts circuit select signal CS(X) on lead 4 to the desired monitor circuit together with either write-to-register signal WR on lead 6 or read-from-register signal RD on lead 7 and monitor register address signal R_ADDRESS on lead 5. If the write-to-register signal WR is asserted then the microprocessor also concurrently asserts data signal DATA on lead 12.

In a write-to-register operation, address decode and flow control subcomponent 1 is enabled by circuit select signal CS(X) on lead 4. Address decode and flow control subcomponent 1 decodes signal R_ADDRESS on lead 5 into one of 25 signals and, in conjunction with signal WR on lead 6, generates a single-lead directed-register-write-to signal W on one of the leads of connections 10 or 11. The directed-register-write-to signal W is applied to the target monitor circuit register and the values of signal DATA on lead 12 are written into the target register.

In a read-from-register operation, address decode and flow control subcomponent 1 is enabled by circuit select signal CS(X) on lead 4. Address decode and flow control subcomponent 1 decodes signal R_ADDRESS on lead 5 into one of 25 signals and, in conjunction with signal RD on lead 7, generates a single-lead directed-register-read-from signal R on one of the leads of connections 8 or 9. The directed-register-read-from signal R is applied to the target monitor circuit register and the value in the register is applied to DATA lead 12 of microprocessor bus 3 and is read by the microprocessor.

Figure 4:
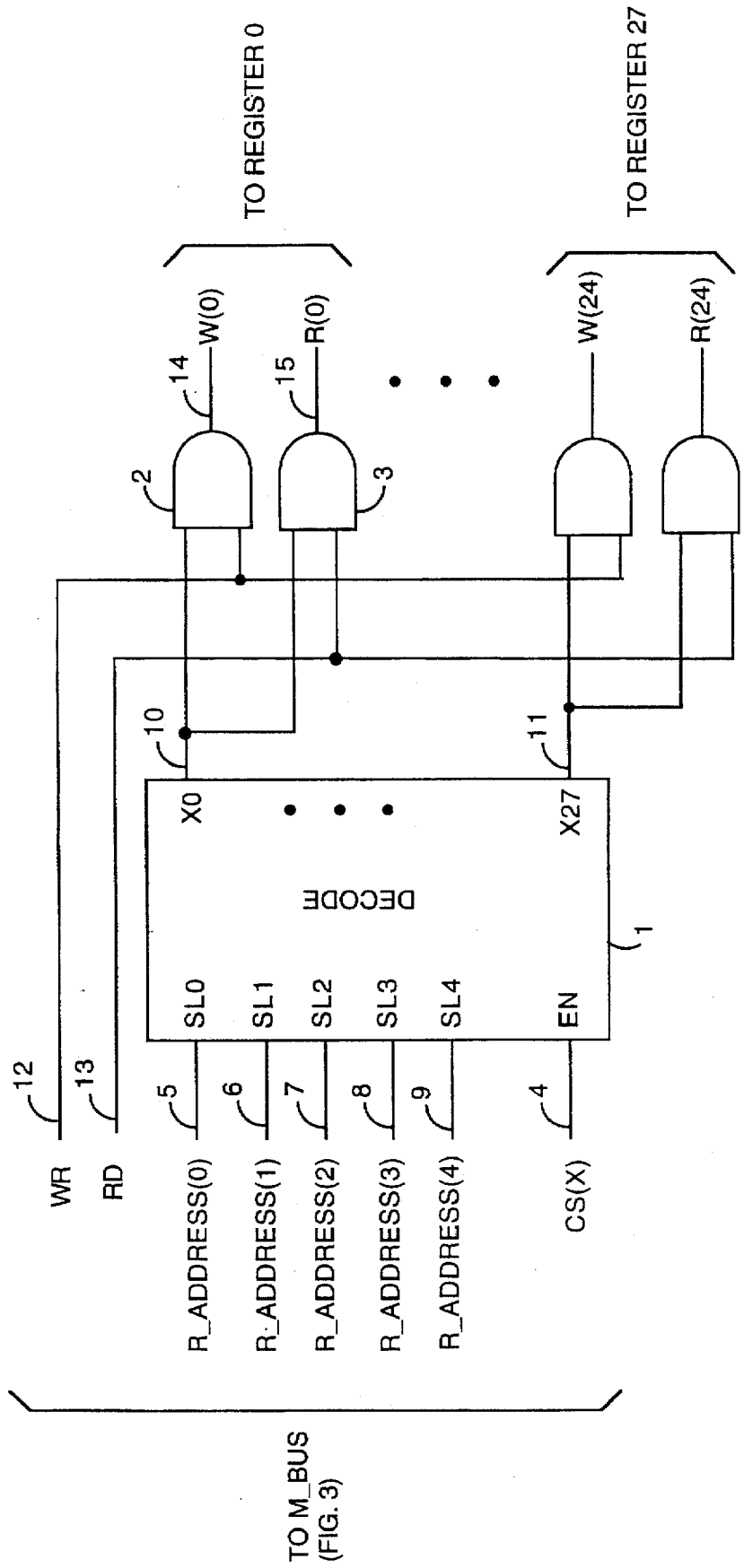
FIG. 4 is a logic diagram showing the address decode and flow control subcomponent of the microprocessor interface and registers component.

FIG. 4 shows the logic diagram for address decode and flow control subcomponent 1 of FIG. 3. Decoder 1 is enabled by circuit select signal CS(X) on lead 4. The decoder address input is supplied by register address signal R_ADDRESS(4:0) on selector leads 5 to 9. The decoder applies a logic level 1 signal on one of the 25 leads 10–11. As shown, decoder output X0 on lead 10 is connected to AND gates 2 and 3. AND gate Z also receives write-to-register signal WR on lead 12, and AND gate 3 receives read-from-register signal RD on lead 13. A pair of AND gates is similarly associated with each of the 25 decoder output leads 10–11.

As an example of circuit operation, if monitor circuit register 0 of this monitor circuit is selected for a write-to-register operation, signal CS(X) on lead 4 would be asserted, register address signal R_ADDRESS(4:0) on leads 5 to 9 would have a value of '00000'b and signal WR on lead 12 would be asserted. Decoder 1 would assert signal X0 on lead 10. AND gate 2, having input signals WR and X0 both asserted, would generate directed-register-write-to signal W(0) on lead 14. In similar fashion, all directed-register-write-to signals W(24:0) and directed-register-read-from signals R(24:0) are generated.

Figure 5:
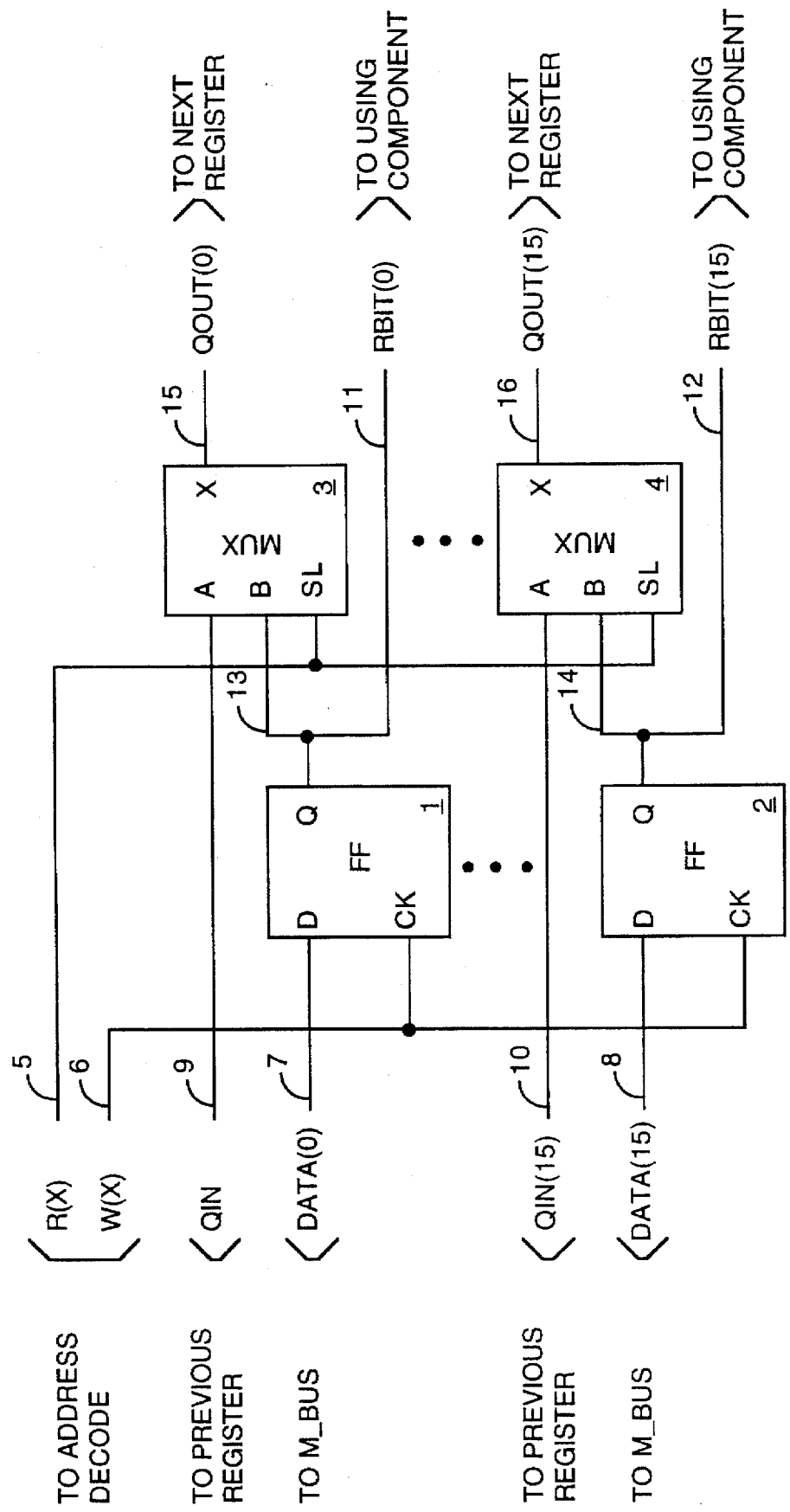
FIG. 5 is a logic diagram showing the read/write bus that connects the monitor registers.

FIG. 5 shows the logic diagram for a single monitor circuit register and the read and write data paths in monitor registers subcomponent 2. Each monitor register comprises 16 flip-flops 1–2, one for each register bit. Each flip-flop receives a data signal from one lead of DATA(15:0) on leads 7–8, and all flip-flops receive a clock signal from directed-register-write-to signal W(X) on lead 6. In a write-to-register operation, signal DATA(15:0) on leads 7–8 from the microprocessor contains the data to be written to the register. Directed-register-write-to signal W(X) on lead 6 from address decode and flow control subcomponent (FIG. 4) is asserted and clocks the data values into the flip-flops. Flip-flop data output signals RBIT(15:0) on leads 11–12 provide the register data to the using system components.

Each flip-flop data output signal is also connected to the "B" input signal of multiplexers 3–4 over leads 13–14. Output signals QOUT(15:0) on leads 15–16 are connected to the "A" input signals QIN(15:0) of the corresponding multiplexers of the next monitor register on its leads 9–10. In a read-from-register operation, directed-register-read-from signal R(X) on lead 5 from address decode and flow control subcomponent (FIG. 4) is asserted on the selector input of multiplexers 3–4. This causes multiplexer output signals QOUT(15:0) for this register only to be gated to flip-flops 1–2. Because the multiplexers connected to the subsequent registers in the monitor registers component are all gated to their "A" inputs, they will pass through any data signals applied to them. In this manner, only the contents of the desired register will be asserted on the read path and transmitted to the microprocessor.

Figure 6:
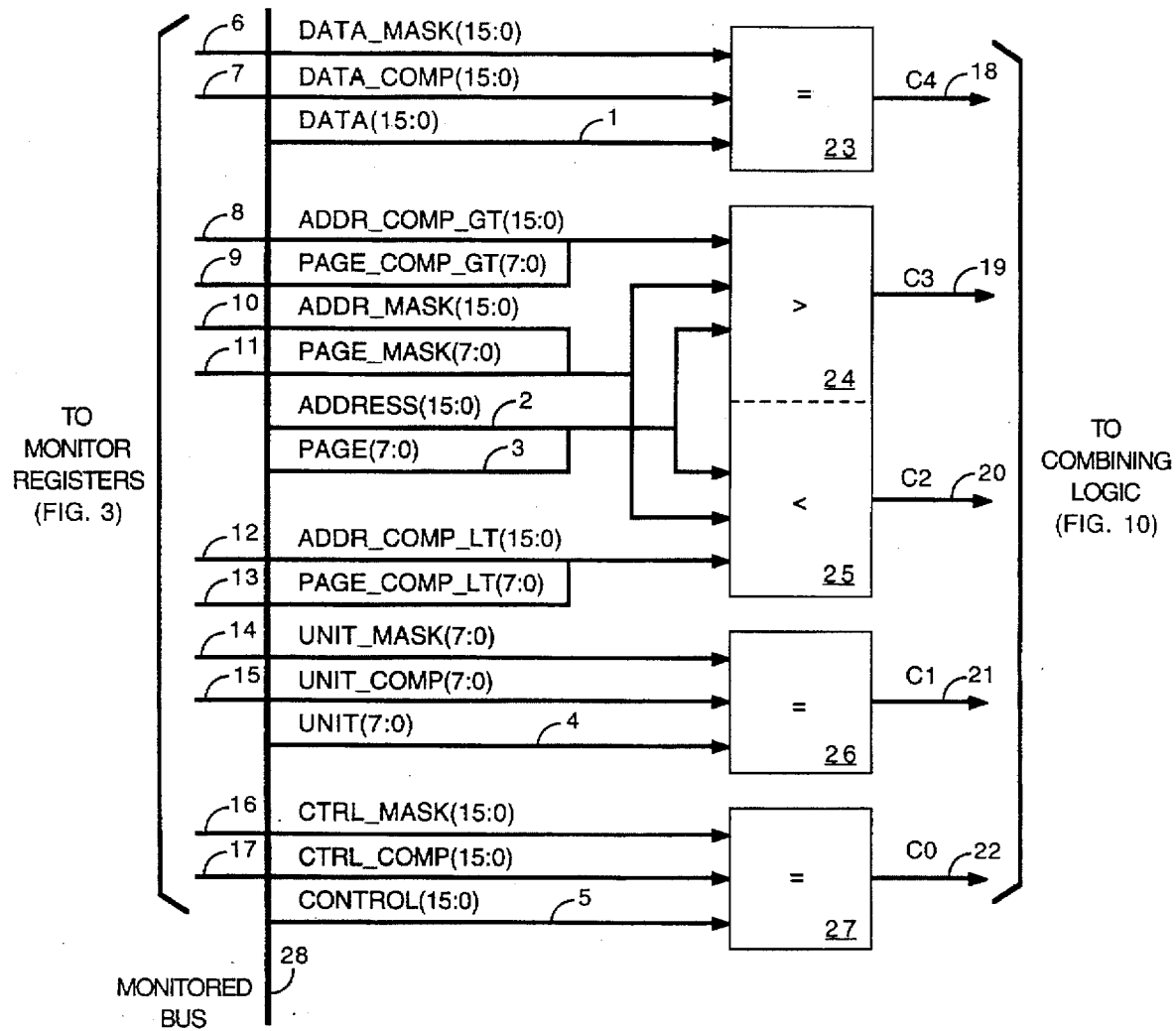
FIG. 6 is a diagram showing the comparison logic component.

FIG. 6 shows a block diagram of the comparison logic subcomponent of the monitor circuit. The comparison logic subcomponent comparator circuits 23–27 perform comparisons of information between the monitored bus and the associated monitor circuit registers and produce output signals on leads 18–22 indicating whether match conditions occurred. The comparison logic subcomponent circuit has input connections to the monitored bus 28 through leads 1–5. The comparison logic subcomponent circuit also receives input signals from registers in monitor registers subcomponent 2 of FIG. 3 over leads 6–17. Information from these registers is compared to signals on the data bus.

The components of the monitored bus in the present embodiment consist of the following: 16 bits for data, 16 bits for address, eight bits for page offset, eight bits for unit designation, and 16 control bits. For purposes of the comparisons, the address and page information is combined and is handled as a 24-bit value ADDR_PAGE. The following five comparisons are made in the comparison logic subcomponent comparator circuits 23–27 with signals C4–C0 asserted over leads respectively, when the resultant comparisons are true:

C4—Monitored bus data equals value in DATA_COMP register, ignoring DATA_MASK register bits;

C3—Monitored bus address/page is greater than value in ADDR_PAGE_COMP_GT registers, ignoring ADDR_PAGE_MASK register bits;

C2—Monitored bus address/page is less than value in ADDR_PAGE_COMP_LT registers, ignoring ADDR_PAGE_MASK register bits;

C1—Monitored bus unit equals value in UNIT_COMP register, ignoring UNIT_MASK register bits;

C0—Monitored bus control bits equal value in CTRL_COMP register, ignoring CTRL_MASK register bits.

In operation, for each bit that is set in one of the "MASK" registers, the corresponding bits must be set in the associated "COMP" registers.

Figure 7:
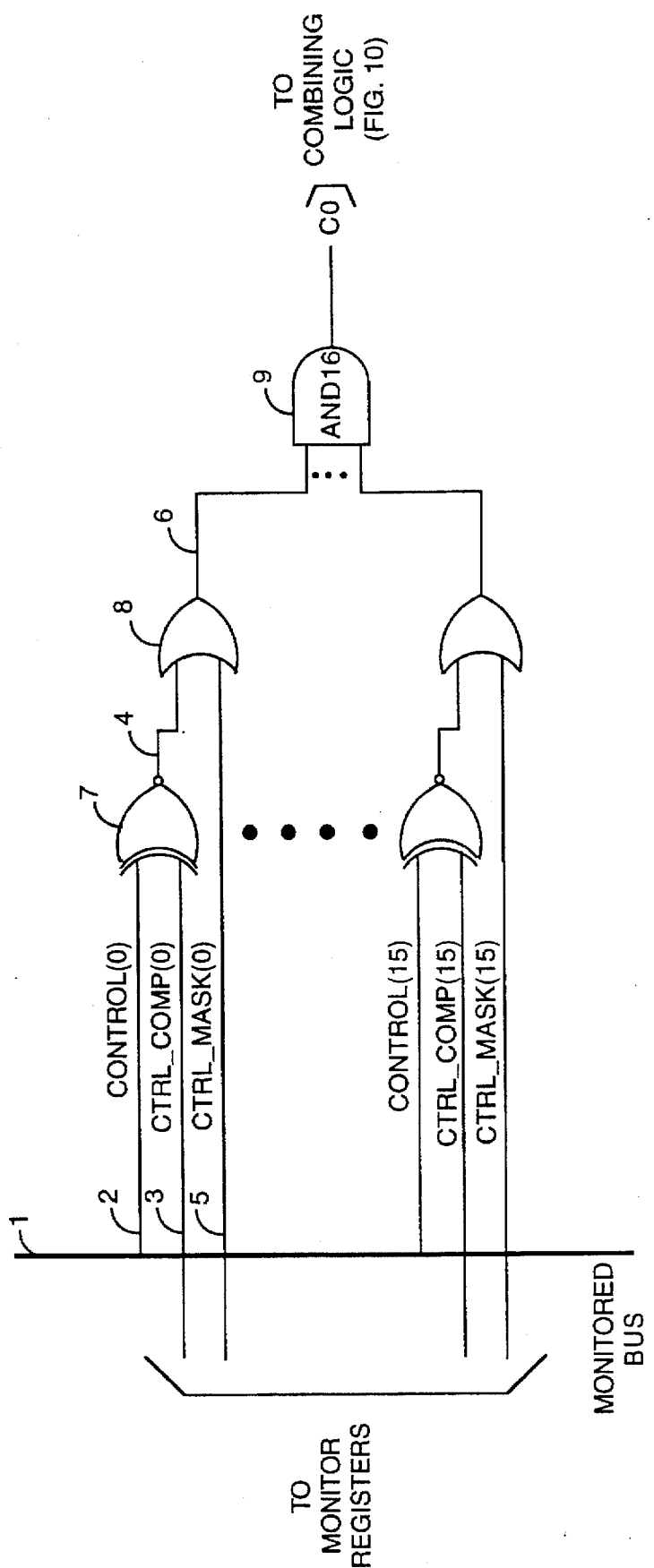
FIG. 7 is a logic diagram showing the monitored bus control component comparison circuit.

FIG. 7 shows the logic diagram for comparator circuit 27 of FIG. 6. This circuit compares the 16 bits of control information CONTROL on the monitored bus with predetermined bit pattern CTRL_COMP stored in monitor registers component, ignoring bits corresponding to the asserted bits in register CTRL_MASK, and indicates if the values are equal. The comparator circuit groups all bit 0's, 1's, etc., and handles each group separately and AND's the results together. For bit 0, signal CONTROL(0) of monitored bus 1 on lead 2 and signal CTRL_COMP(0) on lead 3 from monitor registers component are input to XOR gate 7. The output signal of XOR gate 7 on lead 4 and signal CTRL_MASK(0) on lead 5 from monitor registers component are input to OR gate 8. The output of OR gate 8 on lead 6 is input to AND gate 9. The output signal of OR gate 8 will be "TRUE" if signals CONTROL(0) and CTRL_COMP(0) have the same value or if signal CTRL_MASK(0) is "TRUE". All 16 bits of signal CONTROL are compared to signals CTRL_COMP and CTRL_MASK in this manner, with the results of these comparisons input to AND gate 9. If all of the bit comparisons result in "TRUE" then signal C0 will be asserted.

In similar fashion, signal UNIT on the monitored bus is compared to signals UNIT_COMP and UNIT_MASK from the monitor registers component, and signal DATA on the monitored bus is compared to signals DATA_COMP and DATA_MASK from the monitor registers component.

Figure 8:
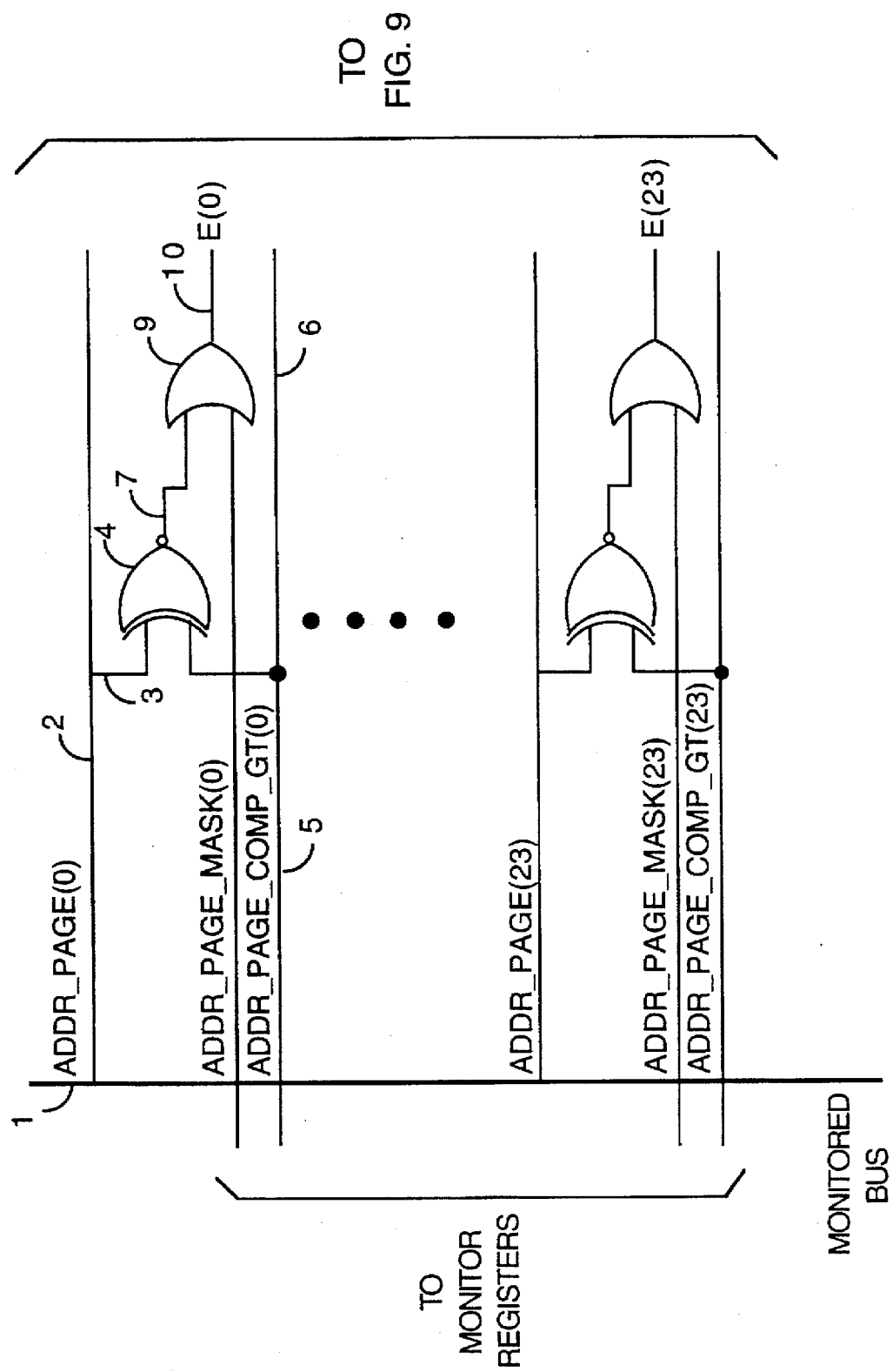
FIG. 8 is a logic diagram showing the first part of the monitored bus address and page component comparison circuit.
Figure 9:
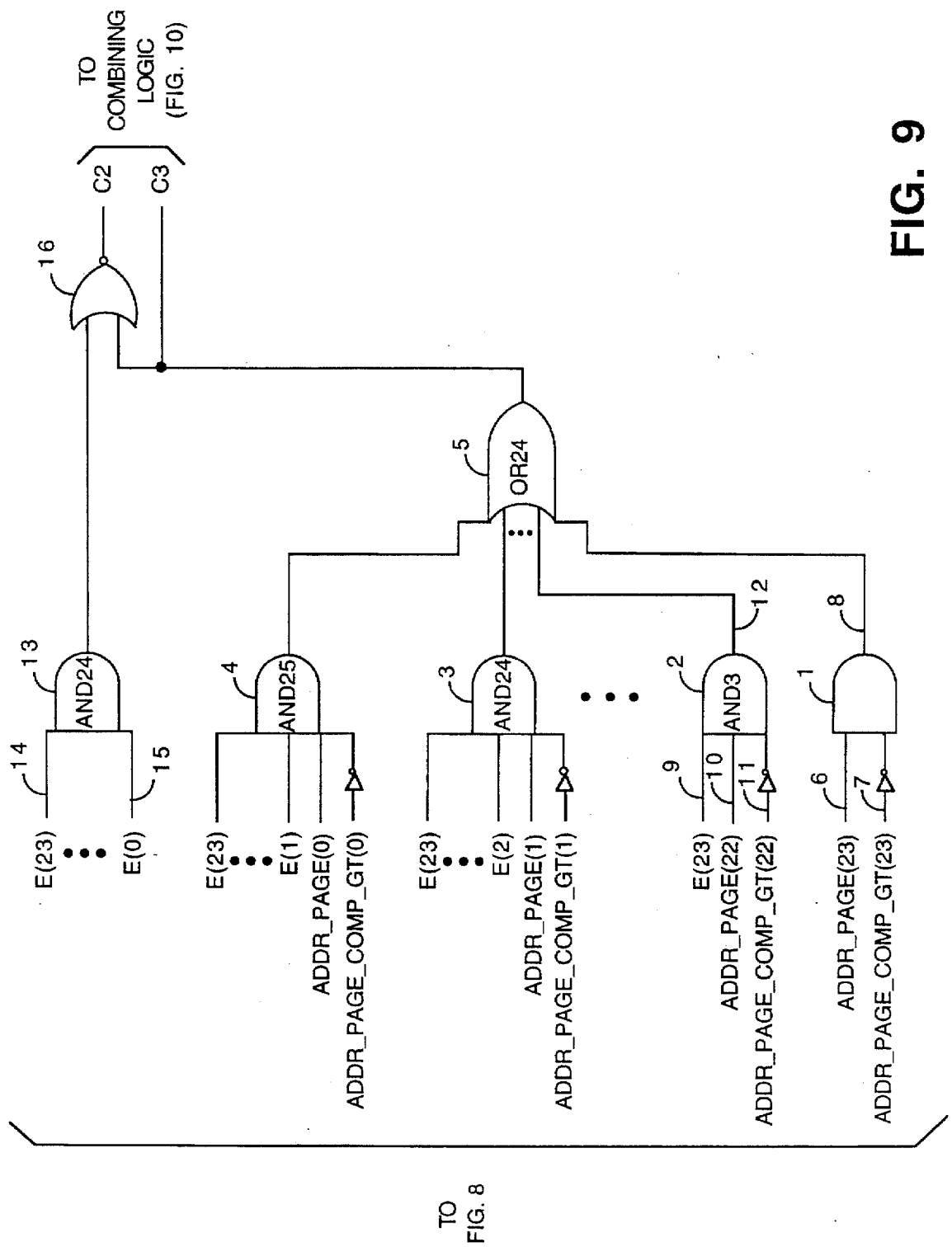
FIG. 9 is a logic diagram showing the second part of the monitored bus address and page component comparison circuit.

FIG. 8 and FIG. 9 show the logic diagrams for comparator circuit 24 of FIG. 6. This comparator compares ADDR_PAGE, the combined ADDRESS and PAGE signals from the monitored bus, with ADDR_PAGE_COMP_GT, the combined predetermined bit patterns ADDR_COMP_GT and PAGE_COMP_GT, ignoring bits corresponding to the asserted bits in ADDR_PAGE_MASK, the combined registers ADDR_MASK and PAGE_MASK, and indicates by a "TRUE" value on signal C3 if the value of ADDR_PAGE on the monitored bus is greater than the value of ADDR_PAGE_COMP_GT from the monitor registers component.

FIG. 8 shows the first part of the logic diagram for comparator circuit 24. The comparator circuit groups all bit 0's, 1's, etc., of the input signals and handles each group separately. Looking at bit 0, signal ADDR_PAGE(0) on lead 2 from monitored bus 1 and signal ADDR_PAGE_COMP_GT(0) on lead 5 from monitor registers component are input to XOR gate 4. The output of XOR gate 4 on lead 7 and signal ADDR_PAGE_MASK(0) on lead 8 from monitor registers component are input to OR gate 9. Output signal E(0) on lead 10 of OR gate 9 is passed to the second part of this circuit as illustrated in FIG. 9. Signal E(0) on lead 10 of OR gate 9 will be "TRUE" if signals ADDR_PAGE(0) and ADDR_PAGE_COMP_GT(0) are the same or if signal ADDR_PAGE_MASK(0) is "TRUE". Signal ADDR_PAGE(0) and ADDR_PAGE_COMP_GT(0) are also passed to the second part of this circuit. All remaining bits of ADDR_PAGE, ADDR_PAGE_COMP_GT and ADDR_PAGE_MASK are handled in similar fashion.

FIG. 9 shows the second part of the logic diagram for comparator circuit 24. In essence, the 24 AND gates 1–4 systematically compare the 24 bits of signal ADDR_PAGE with the corresponding bits of signal ADDR_PAGE_COMP_GT, stepping from the highest order bit of ADDR_PAGE to the lowest, checking for the first occurrence of an un-masked ADDR_PAGE bit being greater than the corresponding ADDR_PAGE_COMP_GT bit with ADDR_PAGE bits of a higher order being equal to the corresponding ADDR_PAGE_COMP_GT bits or ignored. If there is such an occurrence, that AND gate will assert a "TRUE" signal causing a "TRUE" signal C3 and indicate that the value of signal ADDR_PAGE is greater than the value of ADDR_PAGE_COMP_GT, ignoring bits as indicated by ADDR_PAGE_MASK. For the case where signal ADDR_PAGE(23) and signal ADDR_PAGE_COMP_GT(23) are input to AND gate 1, there are no higher order bits and the comparison involves these two signals only. (Note: for each bit that is set in signal ADDR_PAGE_MASK, the corresponding bits must be set in signal ADDR_PAGE_COMP_GT.)

AND gate 1 performs a compare with the highest order bit of signal ADDR_PAGE. AND gate 1 has input signal ADDR_PAGE(23) on lead 6 and the complement of signal ADDR_PAGE_COMP_GT(23) input on lead 7. A "TRUE" output signal from AND gate 1 on lead 8 indicates that ADDR_PAGE(23) is greater than comparison bit ADDR_PAGE_COMP_GT(23). If this highest order bit of signal ADDR_PAGE is greater than comparison bit ADDR_PAGE_COMP_GT(23) then regardless of all other bits, ADDR_PAGE is greater than ADDR_PAGE_COMP_GT.

AND gate 2 has inputs ADDR_PAGE(22) on lead 10, the complement of signal ADDR_PAGE_COMP_GT(22) input on lead 11 and signal E(23) on lead 9. Output signal 12 will be "TRUE" if ADDR_PAGE(22) is greater than comparison bit ADDR_PAGE_COMP_GT(22) and ADDR_PAGE(23) is equal to comparison bit ADDR_PAGE_COMP_GT(23) or ADDR_PAGE(23) is ignored.

As indicated in FIG. 9, each succeeding AND gate through gate 4 inputs the next lower order bit of ADDR_PAGE with the complement of the corresponding bit of ADDR_PAGE_COMP_GT and signals E(X) for bits of a higher order than ADDR_PAGE. For any given values of signals ADDR_PAGE, ADDR_PAGE_COMP_GT and ADDR_PAGE_MASK, at most one of AND gates 1–4 will output a "TRUE" signal.

Comparator circuit 25 of FIG. 6 uses a circuit identical to the one illustrated in FIG. 8 and FIG. 9, however signal ADDR_PAGE_COMP_LT is input to the circuit rather than signal ADDR_PAGE_COMP_GT. This comparator indicates by a "TRUE" signal C2 if the value of signal ADDR_PAGE is less than the value of signal ADDR_PAGE_COMP_LT ignoring bits asserted in signal ADDR_PAGE_MASK. As illustrated in FIG. 9, a "FALSE" signal from OR gate 5 indicates that ADDR PAGE is less than or equal to the comparison signal. AND gate 13 and NOR gate 16 are used to rule out ADDR_PAGE being equal to the comparison signal, leaving only the condition that ADDR_PAGE is less than the comparison signal.

AND gate 13 has input signals E(0) through E(23) on leads 14-15. A "FALSE" signal from this AND gate indicates that the value of signal ADDR_PAGE is not equal to the value of the comparison signal, ignoring masked bits. The output signal of AND gate 13 and the output signal of OR gate 5 are input to NOR gate 16. A "TRUE" output signal from NOR gate 16, and hence a "TRUE" signal C2, indicates that ADDR_PAGE is less than comparison signal ADDR_PAGE_COMP_LT ignoring bits asserted in signal ADDR PAGE MASK.

Figure 10:
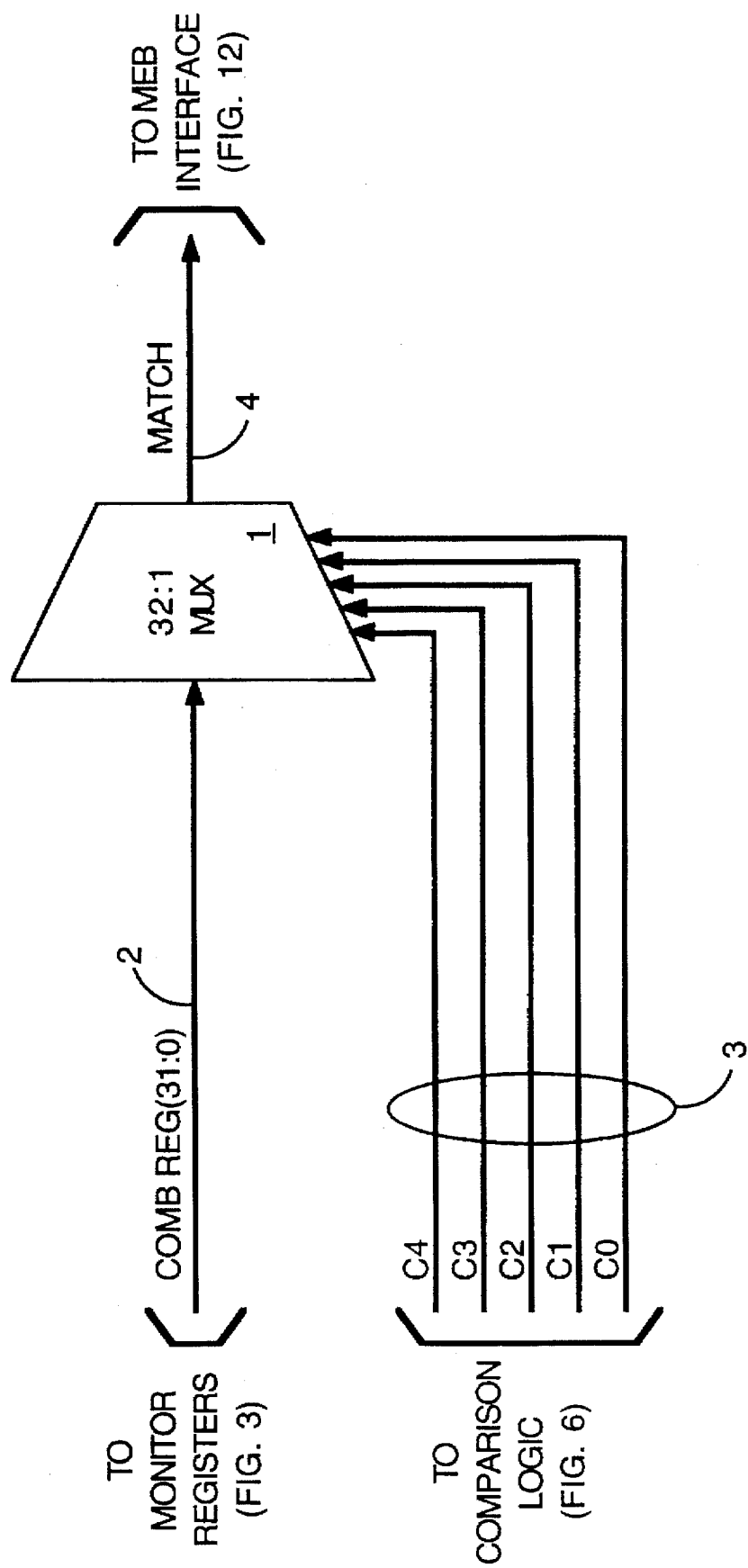
FIG. 10 is a diagram showing the combining logic component.

FIG. 10 shows the combining logic component. This component comprises 32:1 multiplexer 1 with 32-lead input signal COMB REG on lead 2 from monitor registers subcomponent 2 of FIG. 3, gating control input signals C0–C4 on leads 3 from comparison logic component shown in FIG. 6, and output signal MATCH on lead 4. 32-lead input signal COMB REG on lead 2 is from combined 16-bit registers COMB_LOW and COMB_HIGH of monitor registers component 2 of FIG. 3.

The five comparison signals C0–C4 on leads 3 can form 32 possible combinations depending on which specific comparison conditions are met. The 32 bits of signal COMB REG on lead 2 represent a one-to-one mapping onto the 32 possible comparison condition results, and therefore a one-to-one mapping onto the 32 possible values of gating control input signals C0–C4 on leads 3. The microprocessor loads a predetermined 32-bit value into combined monitor circuit registers COMB_LOW and COMB_HIGH with "1"s asserted in the bit positions representing desired positive comparison condition results.

A logic level "1" for output signal MATCH on lead 4 occurs when the comparison results as indicated by comparator output signals C0–C4 on leads 3 matches with one of the acceptable match conditions indicated by the asserted bits of signal COMB REG on lead 2.

Figure 11:
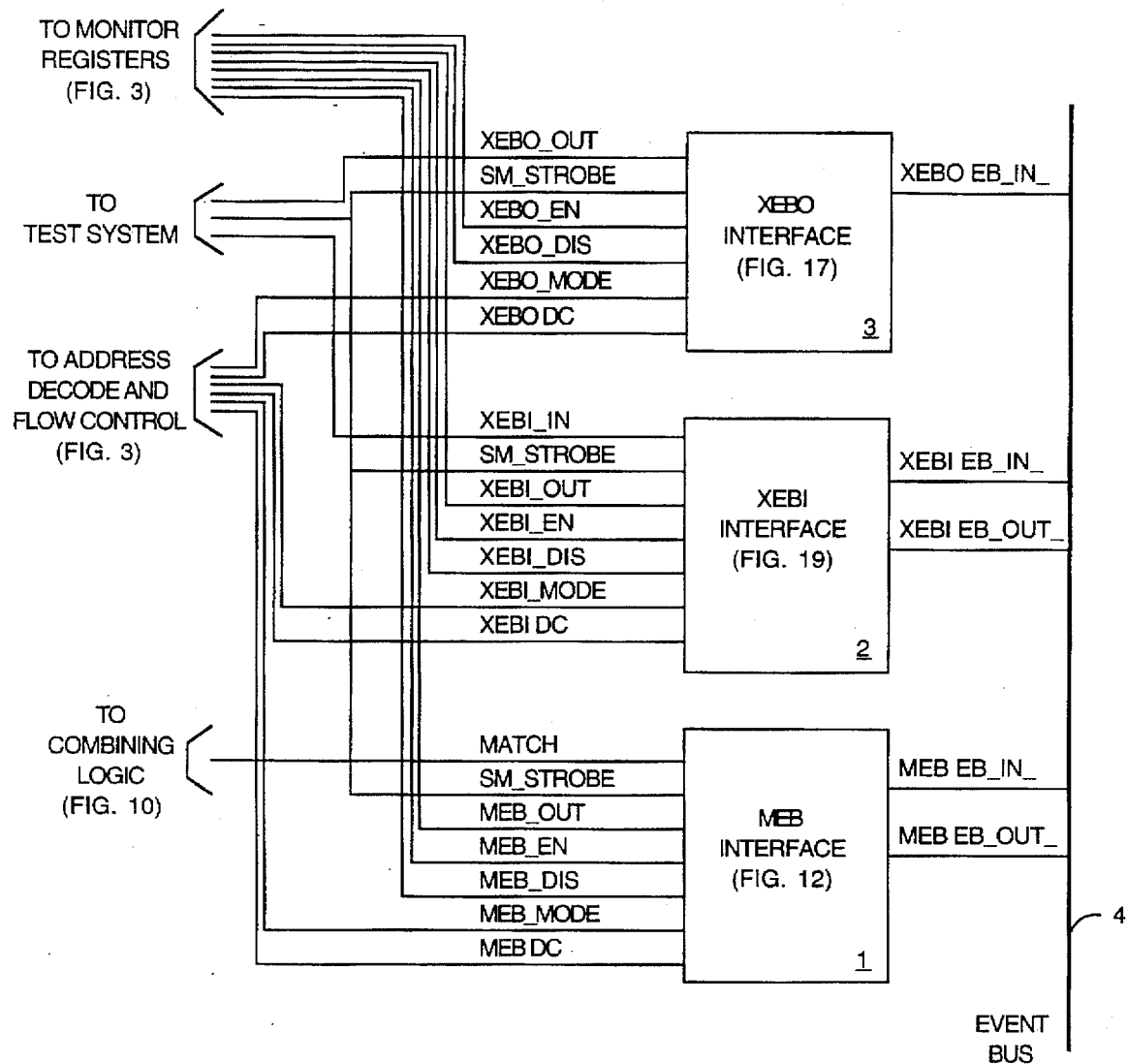
FIG. 11 is a diagram showing the overall event bus interface component.

FIG. 11 is a block diagram of the monitor circuit event bus interface component. There are three interfaces to the event bus within each monitor circuit. MEB interface 1 is used to assert a predetermined bit pattern on the event bus when match conditions occur between bit patterns on the monitored bus and predetermined bit patterns stored in monitor registers subcomponent 2 of FIG. 3. XEBO interface 3 is used to assert a signal on an external pin when bit patterns on the event bus match predetermined bit patterns stored in monitor registers subcomponent 2 of FIG. 3. XEBI interface 2 is used to assert a predetermined bit pattern on the event bus when an external device asserts a signal on an external pin.

Monitor circuit interfaces 1–3 are enabled and disabled by signals on event bus 4. If any asserted bit on event bus 4 matches a corresponding bit of one of the predetermined bit patterns stored in the interface enable and disable registers of monitor registers subcomponent 2 of FIG. 3, that interface will be enabled or disabled, respectively.

Event bus 4 is configured in a "wired OR" configuration whereby each bit is pulled to a negated state in the absence of an asserted signal from one or more of the monitor circuit event bus interface subcomponents 1–4 of any of the monitor circuits of the monitor system.

Figure 12:
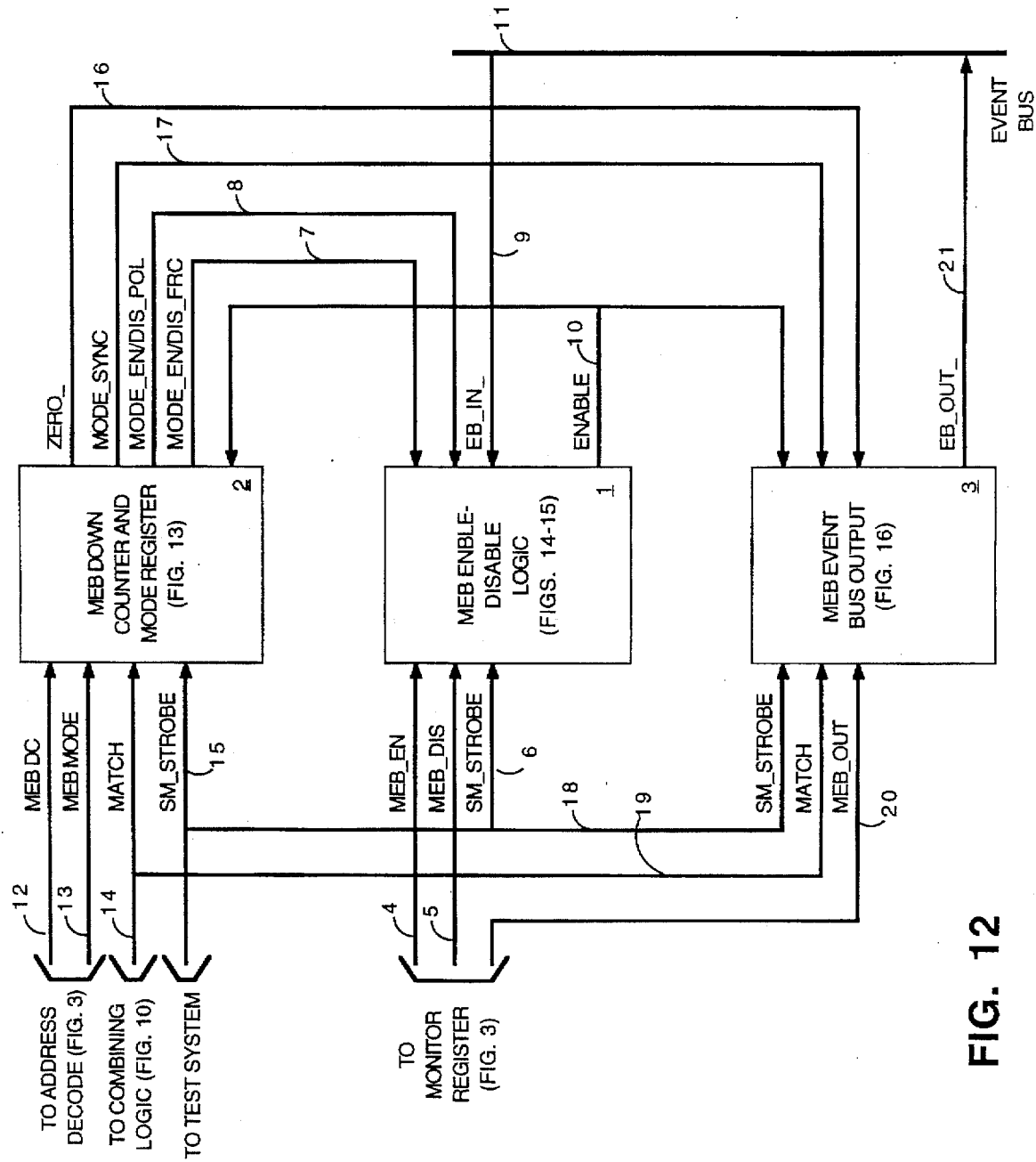
FIG. 12 is a diagram showing the match event bus (MEB) interface component.

FIG. 12 shows match event bus (MEB) interface 1 of FIG. 11. The MEB interface comprises three major subcomponents: enable-disable logic 1, down counter and mode register 2 and event bus output 3.

Enable-disable logic subcomponent 1 receives signals MEB_EN on lead 4 and MEB_DIS on lead 5, both from monitor registers component 2 of FIG. 3, receives external synchronization signal SM_STROBE on lead 6 from the test system, receives signals MODE_EN/DIS_FRC on lead 7 and MODE_EN/DIS_POL on lead 8, both from down counter and mode register subcomponent 2, and receives signal EB_IN_ on lead 9 from event bus 11. Enable-disable logic subcomponent 1 transmits signal ENABLE on lead In operation, output signal ENABLE is asserted when the following conditions are met: at least one corresponding bit between signals MEB_EN and EB_IN_ are both asserted, no corresponding bits between signals MEB_DIS and EB_IN_ are both asserted, and signal MODE_EN/DIS_FRC is not forcing the enable-disable logic subcomponent to be disabled. Signal ENABLE will also be asserted if signal MODE_EN/DIS_FRC is forcing the enable-disable logic subcomponent to be enabled.

Output signal ENABLE is "FALSE" when the following conditions are met: at least one corresponding bit between signals MEB_DIS and EB_IN_ are both asserted and signal MODE_EN/DIS_FRC is not forcing the enable-disable logic subcomponent to be enabled, or signal MODE_EN/DIS_FRC is forcing the enable-disable logic subcomponent to be disabled.

When neither enabling nor disabling inputs are asserted, the enable-disable logic subcomponent output signal ENABLE retains its previous state as of the last rising edge of the external synchronization signal SM_STROBE on lead 6. Signal MODE_EN/DIS_POL controls whether event bus signals are viewed as active-low for purposes of MEB_EN and MEB_DIS comparisons or the default of active-high.

Down-counter and mode registers subcomponent 2 receives signals MEB DC on lead 12 and MEB MODE on lead 13, both from address decode and flow control 1 of FIG. 3, receives signal MATCH on lead 14 from 32:1 multiplexer 1 of FIG. 10, receives external synchronization signal SM_STROBE on lead 15 from the test system and receives signal ENABLE on lead 10 from enable-disable logic subcomponent 1. Down-counter and mode register subcomponent 2 transmits signals ZERO_ on lead 16, MODE_SYNC on lead 17, MODE_EN/DIS_FRC on lead 7 and MODE_EN/DIS_POL on lead 8.

In operation, down-counter circuit 2 comprises an eight-bit down counter that is loaded by the microprocessor over connection 12 and is decremented by one at each occurrence of the combination of signal ENABLE on lead 10, signal MATCH on lead 14 and external synchronization signal SM_STROBE on lead 15. When the counter register reaches zero, signal ZERO_ is asserted on connection 16. The counter register remains at zero until its value is reinitialized by the microprocessor. Down-counter and mode register subcomponent 2 also contains a storage register for MEB_MODE bits that are used to control how the MEB interface circuit operates.

Event bus output subcomponent 3 receives input signal SM_STROBE on lead 18 from the test system, signal MATCH on lead 19 from 32:1 multiplexer 1 of FIG. 10, signal MEB_OUT on lead 20 from monitor registers 2 of FIG. 3, signal ENABLE on lead 10 from enable-disable subcomponent 1, and signals ZERO_ on lead 16 and MODE_SYNC on lead 17, both from down-counter and mode register subcomponent 2.

In operation, the value of signal MEB_OUT on lead will be asserted on event bus 11 through signal EB_OUT_ on lead 21 at the occurrence of the combination of signal ENABLE on lead 10, signal ZERO_ on lead 16 and signal MATCH on lead 19. If signal MODE_SYNC on lead 17 is asserted, signal EB_OUT_ will be asserted on the event bus synchronously with signal SM_STROBE on lead 18.

Figure 13:
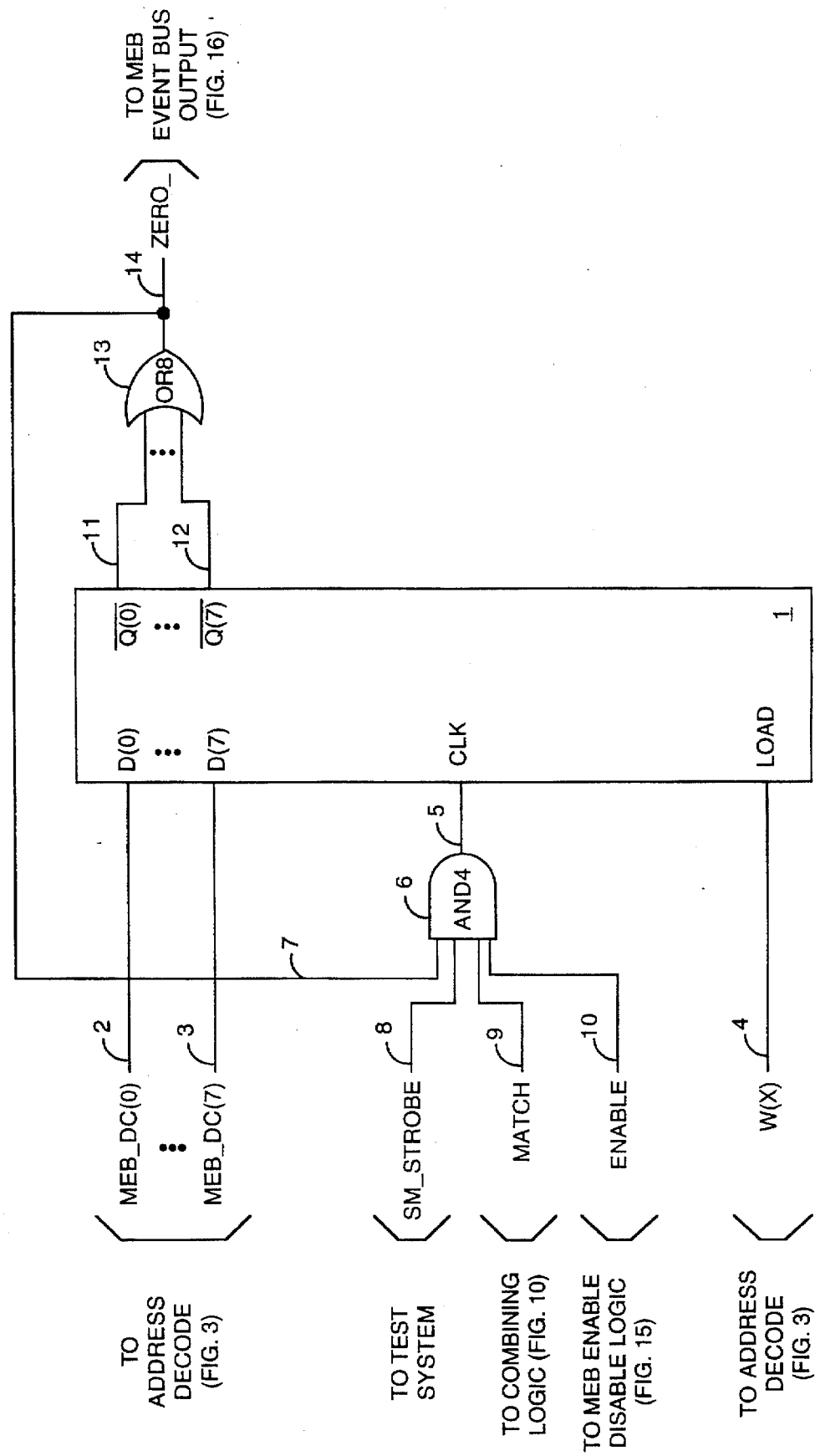
FIG. 13 is a logic diagram showing the MEB down counter and mode register circuit.

FIG. 13 is a logic diagram of the down-counter element of MEB down-counter and mode register subcomponent 2 of FIG. 12. As shown in FIG. 13, down-counter 1 receives data inputs D(0)–D(7) from signals MEB_DC(7:0) on leads 2–3 from address decode and flow control 1 of FIG. 3. The down-counter input load signal is received from directed-write-to-register signal W(X) on lead 4, also from address decode and flow control 1 of FIG. 3. The down-counter clock signal is received from the output of AND gate 6 on lead 5. AND gate 6 has input signals SM_STROBE on lead 8 from the test system, signal MATCH on lead 9 from 32:1 multiplexer 1 of FIG. 10, signal ENABLE on lead 10 from MEB enable-disable logic 1 of FIG. 12, and feedback signal ZERO_ on lead 7 from the output of OR gate 13. Down-counter 1 transmits active-low output signals Q(0)–Q(7) on leads 11–12 into OR gate 13. OR gate 13 outputs active-low signal ZERO_ on lead 14. Although not illustrated, output signals Q(0)–Q(7) are connected to the same read data path, and in the same manner, that the monitor circuit registers are connected to.

In operation, directed-write-to-register signal W(X) triggers the load of the initial down-counter value asserted on signal MEB_DC(7:0). The down-counter is decremented by one at each occurrence of the combination of signal ENABLE, signal MATCH, signal SM_STROBE and the complement of signal ZERO_. Until the down-counter value is decremented to zero, at least one of active-low down-counter output signals Q(0)–Q(7) will have a logic level of "1", causing OR gate 13 to have an output signal with a logic level of "1", causing active-low signal ZERO_ to be "FALSE". When the down-counter value is decremented to zero, the output signal of OR gate 13 will have a logic level of "0" causing active low signal ZERO_ to be "TRUE" also causing the feedback signal on lead 7 to AND gate 6 to have a logic level of "0" which causes down-counter 1 to stop decrementing and maintain a "TRUE" value on active-low output signal ZERO_.

Figure 14:
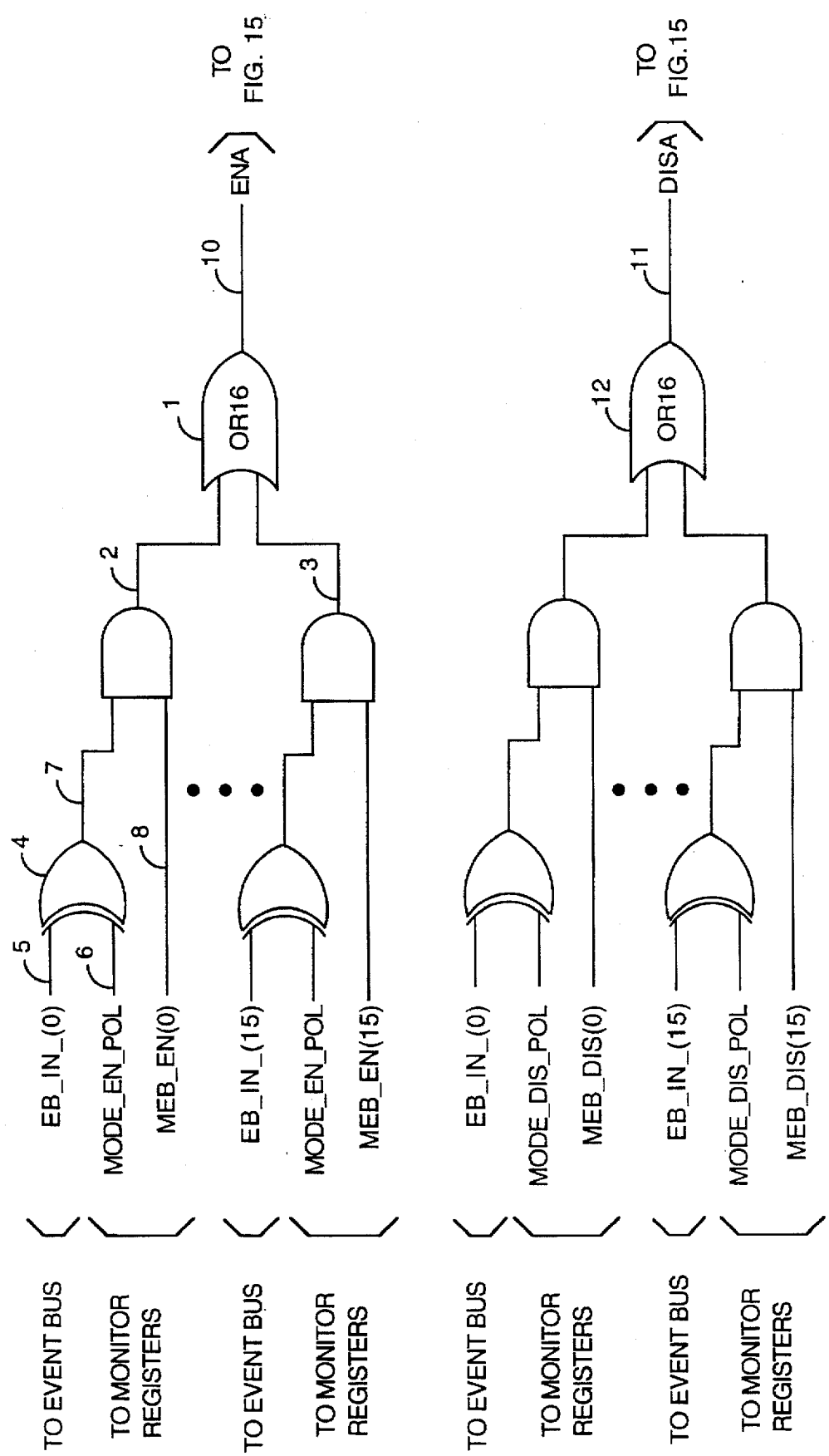
FIG. 14 is a logic diagram showing the first part of the MEB enable-disable logic circuit.
Figure 15:
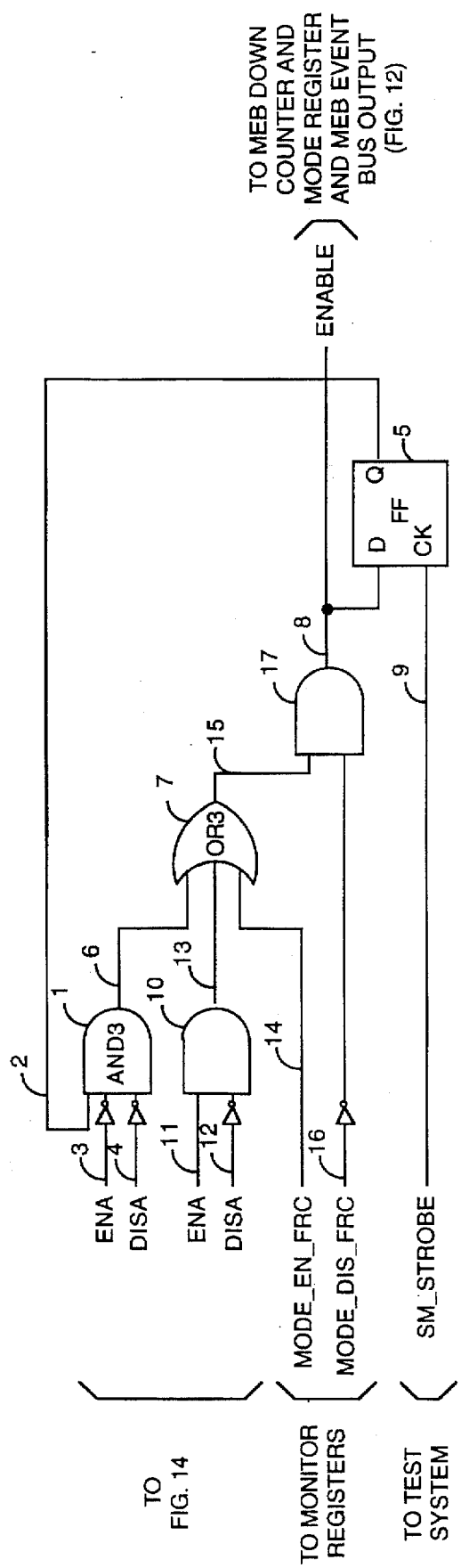
FIG. 15 is a logic diagram showing the second part of the MEB enable-disable logic circuit.

FIG. 14 and FIG. 15 are logic diagrams showing MEB enable-disable component 1 of FIG. 12. FIG. 14 shows the first part of the logic diagram in which signals MEB_EN (15:0) and MEB_DIS(15:0) are compared with signal EB_IN_(15:0) to determine if any corresponding bits match. As shown in FIG. 14, OR gate 1 has 16 input signals on leads 2–3. Each input signal indicates the results of the comparison of one bit of signal MEB_EN with the corresponding bit of signal EB_IN_. Looking at MEB_EN(0), XOR gate 4 has input signals EB_IN_(0) on lead 5 and MODE_EN_POL on lead 6. The output signal of XOR gate 4 on lead 7 and signal MEB_EN(0) on lead 8 are input to AND gate 9. The output signal of AND gate 9 on lead 2 is then input to OR gate 1.

In operation, signal MODE_EN_POL is "1" when signals on the event bus are viewed as active-low, and is "0" when the event bus is viewed as active-high. The normal state for the event bus is active-low. XOR gate 4 will output a logic level "1" signal when signal EB_IN_(0) is "TRUE" and signal MODE EN POL is "1". AND gate 9 will output a "TRUE" signal if signal MEB_EN(0) is also "TRUE". In similar fashion, all bits of signal MEB_EN(15:0) are compared to corresponding bits of signal EB_IN_(15:0). OR gate 1 output signal ENA on lead 10 will be "TRUE" if any asserted bit of signal MEB_EN(15:0) corresponds to a "TRUE" bit of event bus signal EB_IN_(15:0). Similarly, output signal DISA on lead 11 from OR gate 12 will be "TRUE" if any asserted bit of signal MEB_DIS(15:0) corresponds to a "TRUE" bit of event bus signal EB_IN_ (15:0). Signal ENA on lead 10 and signal DISA on lead 11 are input to the second part of the logic diagram illustrated in FIG. 15.

As shown on FIG. 15, signals ENA and DISA are combined with the force enable signal MODE_EN_FRC and the force disable signal MODE_DIS_FRC to generate signal ENABLE, which must be "TRUE" in order for MEB down-counter and mode register subcomponent 2 of FIG. 12 to decrement and for MEB event bus output subcomponent 3 of FIG. 12 to write signal EB_OUT_ onto the event bus. Circuit output signal ENABLE is asserted on lead 8, which also provides the data input signal to flip-flop 5. The value of signal ENABLE is clocked into flip-flop 5 when external synchronization signal SM_STROBE on lead 9 from the test system is asserted. The data output signal of flip-flop 5 on lead 2 is input to AND gate 1 along with the complement of signal ENA on lead 3, and the complement of signal DISA on lead 4. AND gate 10 has input signal ENA on lead 11 and the complement of input signal DISA on lead 12. OR gate 7 inputs the output signal of AND gate 1 on lead 6, the output signal of AND gate 10 on lead 13, and signal MODE_EN_FRC on lead 14. The output signal of OR gate 7 on lead 15 and the complement of signal MODE_DIS_ FRC are input to AND gate 17. The output of AND gate 17 is signal ENABLE on lead 8.

As can be seen from the logic diagram, signal ENABLE on lead 8 will be asserted when the following conditions are met: signals ENA and DISA are not asserted and the last state of signal ENABLE, as of the last strobe of signal SM_STROBE, was "TRUE"; or signal ENA is asserted and signal DISA is not asserted; or force enable signal MODE_ EN_FRC is asserted; and force disable signal MODE_ DIS_FRC is not asserted.

Figure 16:
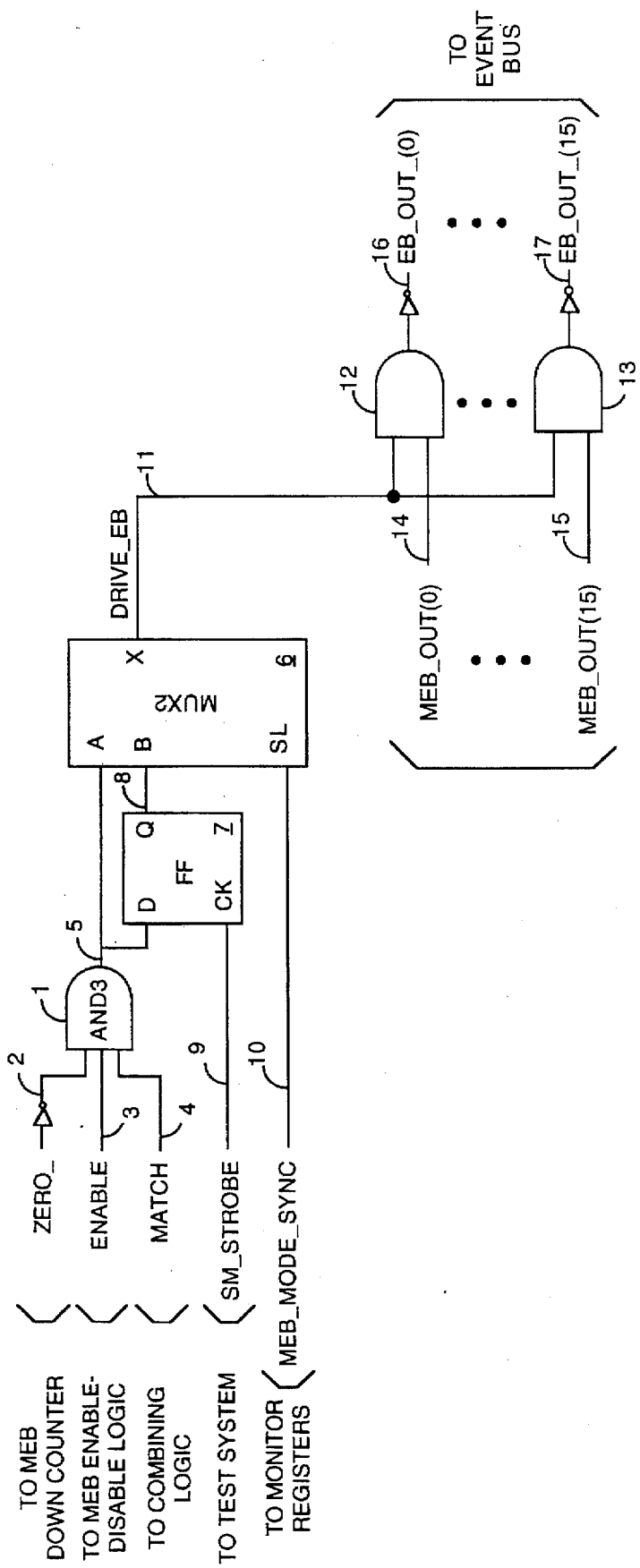
FIG. 16 is a logic diagram showing the MEB event bus output circuit.

FIG. 16 shows the logic diagram for MEB event bus output component 3 of FIG. 12. AND gate 1 has the complement of signal ZERO_ on lead Z along with signal ENABLE on lead 3 and signal MATCH on lead 4 as input signals. The output signal of AND gate 1 on lead 5 is input to the "A" input of multiplexer 6 and the data input of flip-flop 7. The data output signal of flip-flop 7 on lead 8 is connected to the "B" input of multiplexer 6. Signal SM_STROBE on lead 9 is the clock input signal of flip-flop 7. Signal MEB_MODE_SYNC is the selector signal of multiplexer 6. Multiplexer 6 has data output signal DRIVE_ EB on lead 11. Signal DRIVE_EB on lead 11 is input to each of the 16 AND gates 12–13, with the other input of each AND gate being the corresponding signal MEB_OUT(0) to MEB_OUT(15) on leads 14–15. Signals EB_OUT_(0) to EB_OUT_(15) on leads 16–17 are the inverted outputs of AND gates 12–13, respectively.

In operation, an asserted signal DRIVE_EB on lead 11 causes asserted signals EB_OUT_(X) on leads 16–17 where associated signals MEB_OUT(X) on leads 14–15 are asserted. For signal DRIVE_EB on lead 11 to be asserted, input signals to AND gate 1 ZERO_ on lead 2, ENABLE on lead 3 and MATCH on lead 4 all must be asserted. If signal MEB MODE SYNC on lead 10 is a logic level "0", multiplexer 6 will be gated to input signal "A" on lead 5 and signal DRIVE_EB will be asserted when the three aforementioned inputs to AND gate 1 are all concurrently asserted. If signal MEB_MODE_SYNC on lead 10 is a logic level "1", multiplexer 6 will be gated to input signal "B" on lead 8 from flip-flop 7 and signal DRIVE_EB will be asserted when the three aforementioned inputs to AND gate 1 are all concurrently asserted, and external synchronization signal SM_STROBE on lead 9 is asserted on the clock input signal of flip-flop 7.

Figure 17:
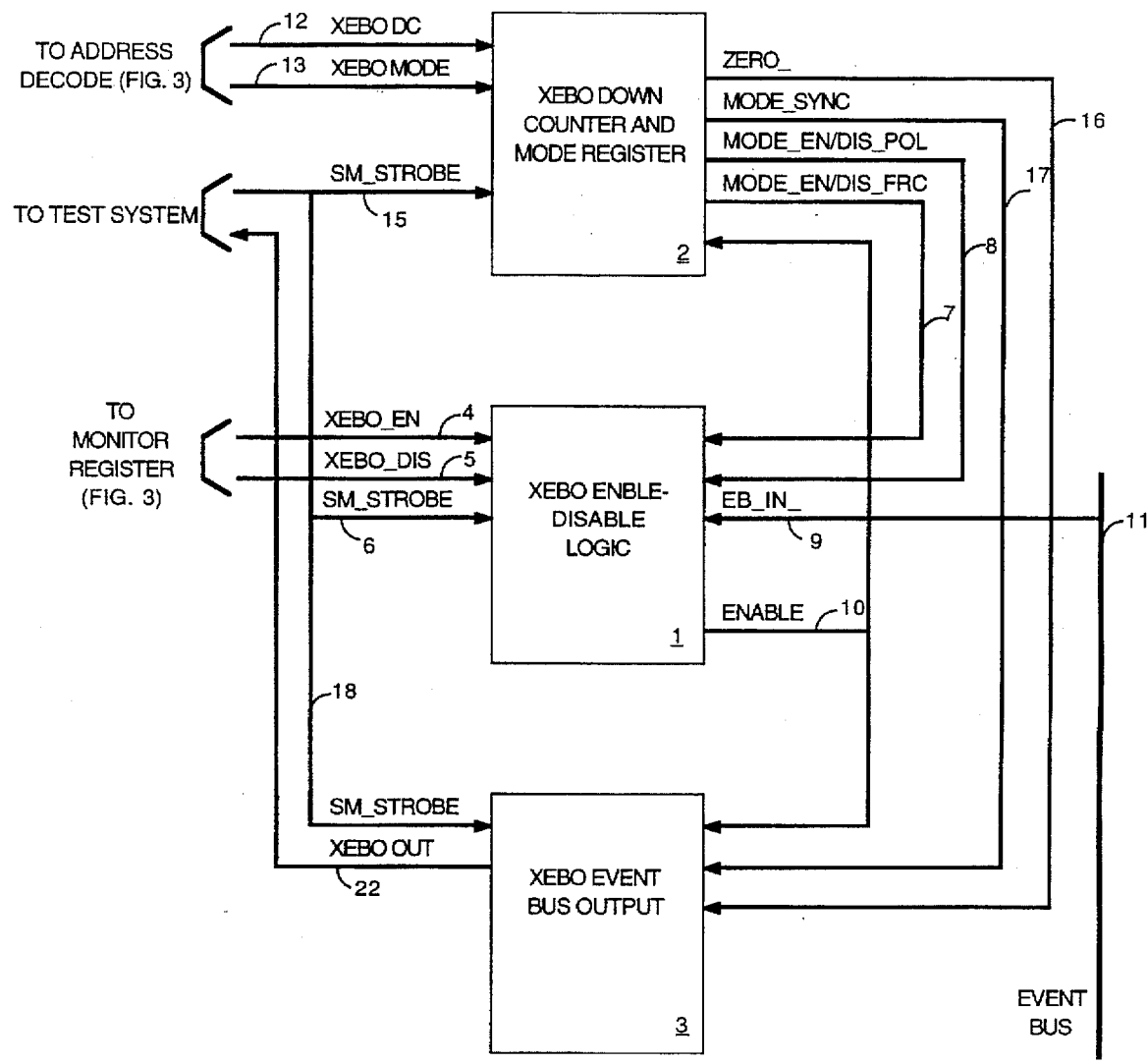
FIG. 17 is a diagram showing the extended event bus output (XEBO) interface component.
Figure 19:
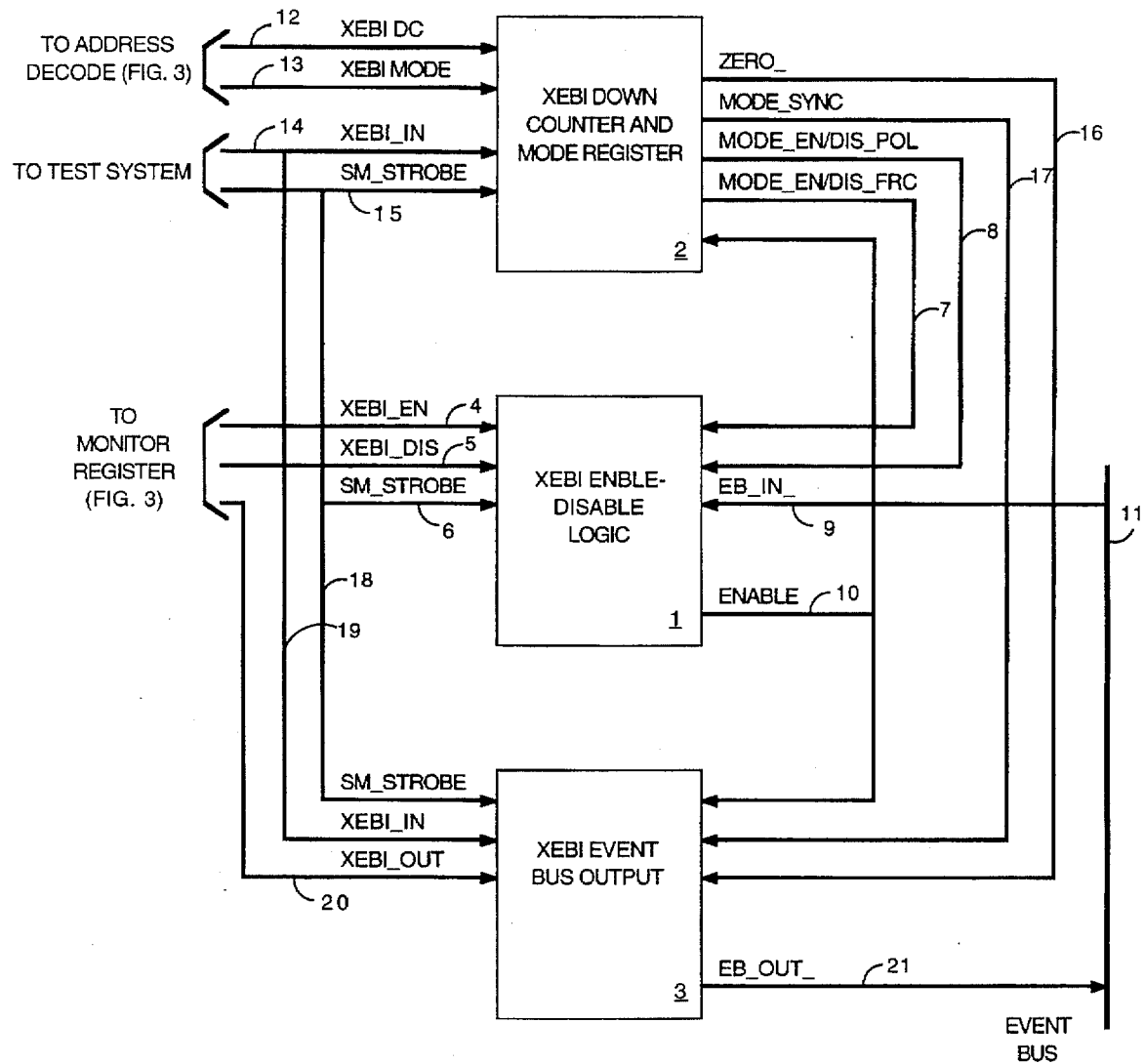
FIG. 19 is a diagram showing the extended event bus input (XEBI) interface component.

FIG. 17 and FIG. 19 illustrate the XEBO interface and the XEBI interface, respectively. The way and the manner that these two interfaces perform operations is very similar to that of the MEB interface shown in FIGS. 12-16. In FIG. 17 and FIG. 19, XEBO and XEBI components similar to those of the MEB interface illustrated in FIG. 12 are designated by like reference numerals and are similarly operable with likewise numbered and similarly named connections. However the monitor circuit register connections will be to a set of monitor circuit registers specific to the interface that is illustrated.

FIG. 17 illustrates the XEBO interface. The main function of the XEBO interface is to assert signal XEBO OUT on lead 22 to an external pin that is read by the test system when the signal on the event bus and a predetermined bit pattern stored in a monitor circuit register have any corresponding bits asserted. Enable-disable logic subcomponent 1 operates in a manner identical to enable-disable logic subcomponent 1 of the MEB interface described above and illustrated in FIGS. 12, 14, and 15. Down-counter and mode register subcomponent 2 operates in a manner identical to down counter and mode register subcomponent 2 the MEB interface described above and illustrated in FIGS. 12 and 13, with the exception that connection MATCH 14 of FIG. 12 is not available on XEBO down-counter and mode register subcomponent 2. The down counter circuits of both the MEB and XEBO interfaces are identical, however signal MATCH on lead 9 of AND gate 6 of FIG. 13 is hard-wired to "positive" when this circuit is used in the XEBO interface.

Figure 18:
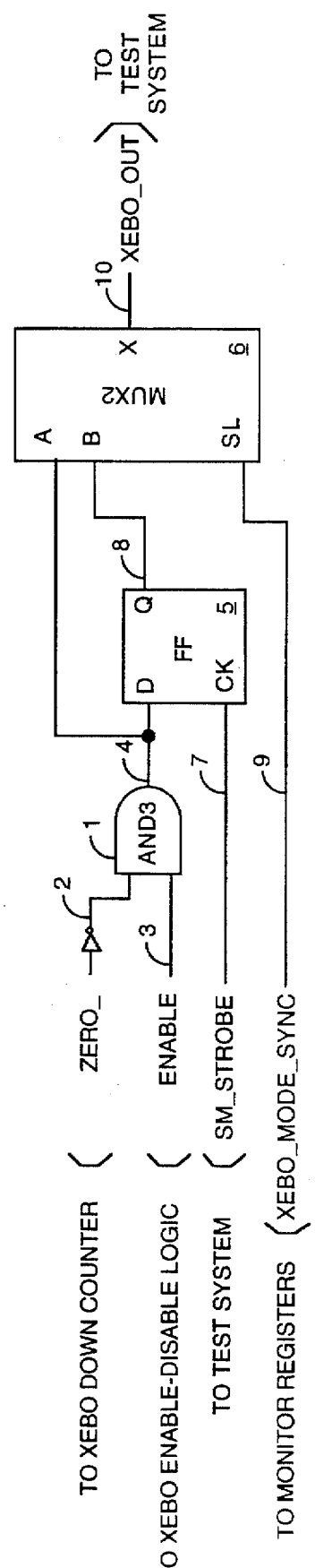
FIG. 18 is a logic diagram showing the XEBO event bus output circuit.

FIG. 18 shows the logic diagram for XEBO event bus output component 3 of FIG. 17. AND gate 1 receives the complement of input signal ZERO_ on lead 2 from XEBO down counter and mode register component 2 of FIG. 17, and input signal ENABLE on lead 3 from XEBO enable-disable logic component 1 of FIG. 17. The output signal from AND gate 1 on lead 4 is connected to the data input signal of flip-flop 5 and also to the "A" input of multiplexer 6. Flip-flop 5 also receives clock input signal SM_STROBE on lead 7 from the test system and has its data output signal on lead 8, which is connected to the "B" input of multiplexer 6. Multiplexer 6 also receives selector input signal XEBO_MODE_SYNC on lead 9 and has data output signal XEBO_OUT on lead In operation, external signal XEBO_OUT on lead can be asserted when AND gate 1 receives asserted signals ZERO_ and ENABLE. If signal XEBO_MODE_SYNC is not asserted, signal XEBO_OUT will be asserted when the aforementioned input signals to AND gate 1 are concurrently asserted. If signal XEBO_MODE_SYNC is asserted, signal XEBO_OUT will be asserted when the aforementioned input signals to AND gate 1 are concurrently asserted and external synchronization signal SM_STROBE is also asserted.

FIG. 19 illustrates the XEBI interface. The main function of the XEBI interface is to apply a predetermined bit pattern stored in the monitor circuit registers to the event bus when the test system asserts signal XEBI_IN. The XEBI interface illustrated in FIG. 19 and the MEB interface illustrated in FIG. 12 operate in identical manners, except that input signal MATCH on lead 14 of FIG. 12 from the combining logic component of FIG. 10 is replaced in the XEBI interface by external input signal XEBI_IN on lead 19 of FIG. 19 from the test system.

While the inventive system has been particularly shown and described, it is not intended to be exhaustive nor to limit the invention to the embodiment disclosed.

It will be apparent to those skilled in the art that modifications can be made to the present invention without departing from the scope and spirit thereof. It is intended that the scope of the invention be defined by the claims appended hereto and their equivalents.

APPENDIX 1

The microprocessor can write to and read from all of the registers in the monitor system.

| | | |
|---|---|---|
| 1. DATA_COMP | | 16-bit register specifies the value to which the BUT data bus value is to be compared. |
| 2. DATA_MASK | | 16-bit register provides bit mask specifying which data bits on the BUT are to be ignored when compared to corresponding bit values specified in the DATA_COMP register. |
| 3. ADDR_COMP_GT | | 16-bit register specifies byte offset value to which the addresses generated on the BUT will be compared. |
| 4. ADDR_COMP_LT | | 16-bit register specifies byte offset value to which the addresses generated on the BUT will be compared. |
| 5. ADDR_MASK | | 16-bit register provides bit mask specifying which address bits on the BUT are to be ignored when compared to corresponding bit values specified in the ADDR_GT and ADDR_LT registers. |
| 6. PAGE_COMP_GT | | 8-bit register specifies value to which the page number on the BUT is to be compared. |
| 7. PAGE_COMP_LT | | 8-bit register specifies the value to which the page number on the BUT is to be compared. |
| 8. PAGE_MASK | | 8-bit register provides a bit mask specifying which page bits on the BUT are to be ignored when the BUT page is compared to corresponding bit values specified in the PAGE_COMP register. |
| 9. UNIT_COMP | | 8-bit register specifies value to which the unit number on the BUT is to be compared. |
| 10. UNIT_MASK | | 8-bit register provides a bit mask specifying which unit bits on the BUT are to be ignored when the BUT unit is compared to corresponding bit values specified in the UNIT_COMP register. |
| 11. CTRL_COMP | | 16-bit register specifies value to which control bits on the BUT are to be compared. |
| 12. CTRL_MASK | | 16-bit register provides a bit mask specifying which control bits on the BUT are to be ignored when BUT is compared to corresponding bit values specified in the CTRL_COMP register. |
| 13. COMB_LOW | | Lower half of the 32-bit Combination Register. The Combination Register contains a map of the desired output for the MATCH signal. |
| 14. COMB_HIGH | | Upper half of the Combination |

APPENDIX 1-continued

The microprocessor can write to and read from all of the registers in the monitor system.

| | |
|---|---|
| 15. MEB_EN | Register. 16-bit register provides a bit mask specifying which bits on the EB, when active, will cause the MEB interface to become enabled. Any bit-wise match will cause the MEB interface to be enabled. |
| 16. XEBO_EN | 16-bit register provides a bit mask specifying which bits on the EB, when active, will cause the XEBO interface to become enabled. Any bit-wise match will cause the XEBO interface to be enabled. |
| 17. XEBI_EN | See 16. XEBO_EN. |
| 18. MEB_OUT | 16-bit register provides a bit mask specifying which of the EB signals will be asserted by the MEB Interface if the conditions for which it is programmed occur. |
| 19. XEBI_OUT | 16-bit register provides a bit mask specifying which of the EB signals will be asserted by the XEBI Interface if enabling conditions occur. |
| 20. MEB_DIS | 16-bit register provides bit mask specifying which of the EB signals, when asserted, will cause the MEB interface to become disabled. Any bit-wise match will cause the interface to be disabled. When both an enabling event and a disabling event are simultaneously asserted, the MEB interface will be disabled. |
| 21. XEBO_DIS | 16-bit register provides bit mask specifying which of the EB signals, when asserted, will cause the XEBO Interface to become disabled. Any bit-wise match will cause the interface to be disabled. When both an enabling event and a disabling event are simultaneously asserted, the XEBO Interface will be disabled. |
| 22. XEBI_DIS | 16-bit register provides bit mask specifying which of the EB signals, when asserted, will cause the XEBI Interface to become disabled. Any bit-wise match will cause the interface to be disabled. When both an enabling event and a disabling event are simultaneously asserted, the XEBI Interface will be disabled. |
| 23. MEB_MODE | 8-bit register governs various control functions. |
| ENBL_POL | If bit is set, then for purposes of enabling the MEB Interface, EB signals are active-low. |
| DSBL_POL | If bit is set, then for purposes of disabling the MEB Interface, EB signals are active-low. |
| ENBL_FRCE | If bit is set, then the MEB Interface is forced to be enabled, regardless of other conditions except DSBL_FRCE. |
| DSBL_FRCE | If bit is set, then the MEB Interface is forced to be disabled, regardless of all other conditions. |

APPENDIX 1-continued

The microprocessor can write to and read from all of the registers in the monitor system.

| | |
|---|---|
| OUTPUT_SYNC | If bit is set then the enabling and disabling conditions are synchronized (clocked) using the SM_STROBE signal. If bit is "zero" then the enabling/disabling conditions are asynchronous and the MEB Interface is controlled combinationally. |
| 24. XEBO_MODE | 8-bit register governs various control functions. |
| ENBL_POL | If bit is set, then for purposes of enabling the XEBO, EB signals are active-low. |
| DSBL_POL | If bit is set, then for purposes of disabling the XEBO, EB signals are active-low. |
| ENBL_FRCE | If bit is set, then the XEBO Interface is forced to be enabled, regardless of other conditions except DSBL_FRCE. |
| DSBL_FRCE | If bit is set, then the XEBO Interface is forced to be disabled, regardless of all other conditions. |
| SYNC_EN | If bit is set then the enabling and disabling conditions are synchronized (clocked) using the SM_STROBE signal. If bit is "zero" then the enabling/disabling conditions are asynchronous, and the XEBO Interface is controlled combinationally. |
| 25. XEBI_MODE | 8-bit register governs various control functions. |
| ENBL_POL | If bit is set, then for purposes of enabling the XEBI Interface, EB signals are active-low. |
| DSBL_POL | If bit is set, then for purposes of disabling the XEBI Interface, EB signals are active-low. |
| ENBL_FRCE | If bit is set, then the XEBI Interface is forced to be enabled regardless of other conditions except DSBL_FRCE. |
| DSBL_FRCE | If bit is set, then the XEBI Interface is forced to be disabled regardless of all other conditions. |
| SYNC_EN | If bit is set then the enabling and disabling conditions are synchronized (clocked) using the SM_STROBE signal. If bit is "zero" then the enabling/ disabling conditions are asynchronous and the XEBI Interface is controlled combinationally. |

What is claimed is:

1. A bus monitor system for use in a test system having a monitored bus comprising a plurality of parallel bits, and a microprocessor operated to generate a plurality of predetermined comparison bit patterns, predetermined match enable bit patterns, predetermined match interface output bit patterns, and predetermined output enable bit patterns, said bus monitor system comprising:

a plurality of monitor circuits; and
an event bus having a plurality of parallel bits;
each of said monitor circuits connected to said event bus, said monitored bus and said microprocessor;
each of said monitor circuits operated to receive an associated one of said comparison bit patterns, an associated one of said match enable bit patterns, an associated one of said match interface output bit patterns, and an associated one of said output enable bit patterns;

each of said monitor circuits further operated in response to a match between said associated match enable bit pattern and said event bus bits and a match between said associated comparison bit pattern and said monitored bus bits to apply said associated match interface output bit pattern to said event bus; and each of said monitor circuits further operated in response to a match between said associated output enable bit pattern and said event bus bits to generate an associated monitor system output signal, whereby said associated monitor system output signal indicates a match between said associated comparison bit pattern and said monitored bus bits.

2. A bus monitor system according to claim 1, wherein each of said monitor circuits further comprises:

storage means connected to said microprocessor and comprising storage locations effective to receive said associated comparison bit pattern, said associated match enable bit pattern, said associated output enable bit pattern, and said associated match interface output bit pattern;

comparison means connected to said monitored bus and said storage means, said comparison means operated in response to a match of said stored associated comparison bit pattern and said monitored bus bits to generate an associated match signal;

a match event bus interface connected to said event bus, said storage means and said comparison means, said match event bus interface operated in response to a match between said associated match enable bit pattern and said event bus bits and said associated match signal to apply said stored associated match interface output bit pattern to said event bus; and an event bus output interface connected to said event bus and said storage means, said event bus output interface operated in response to a match of said stored associated output enable bit pattern and said event bus to generate said associated monitor system output signal.

3. A bus monitor system according to claim 2, wherein said associated match interface output bit pattern of one of said monitor circuits is identical to said associated match enable bit pattern of another of said monitor circuits whereby two or more of said monitor circuits operate serially, said serial operation effective to sequentially monitor for monitored bus bit patterns.

4. A bus monitor system according to claim 2, said microprocessor further operated to generate a plurality of match event bus interface sync enable bits and a plurality of event bus output interface sync enable bits and said test system further operated to generate a synchronization signal, wherein:

said storage means further comprises a storage location effective to receive an associated one of said match event bus interface sync enable bits, and an associated one of said event bus output interface sync enable bits;

said match event bus interface is further operated in response to said associated match signal and said stored associated match event bus interface sync enable bit to apply said stored associated match interface output bit pattern to said event bus concurrent with said synchronization signal; and said event bus output interface is further operated in response to a match of said stored associated output enable bit pattern and said event bus and said stored associated event bus output interface sync enable bit to generate said associated monitor system output signal concurrent with said synchronization signal.

5. A bus monitor system according to claim 2, said microprocessor further operated to generate a plurality of match event bus interface force enable bits, wherein:

said storage means further comprises a storage location effective to receive an associated one of said match event bus interface force enable bits; and said match event bus interface is further operated in response to said associated match signal and said stored associated match event bus interface force enable bit to apply said stored associated match interface output bit pattern to said event bus.

6. A bus monitor system according to claim 2, said microprocessor being further operated to generate a plurality of match event bus interface down-counter values, wherein:

said storage means further comprises a storage location effective to receive an associated one of said match event bus interface down-counter values;

said match event bus interface further comprises a match event bus interface down-counter connected to said comparison means, said down-counter operated in response to said associated match signal to decrement said stored associated match event bus interface down-counter value to a value of zero whereupon said down-counter generates an associated signal; and said match event bus interface further operated in response to said associated match event bus interface down-counter signal and said associated match signal to apply said stored associated match interface output bit pattern to said event bus.

7. A bus monitor system according to claim 2, said microprocessor being further operated to generate a plurality of event bus output interface down-counter values, and said test system further operated to generate a synchronization signal, wherein:

said storage means further comprises a storage location effective to receive an associated one of said event bus output interface down-counter values;

said event bus output interface further comprises an event bus output interface down-counter connected to said test system, said down-counter operated in response to said synchronization signal and to a match of said stored associated output enable bit pattern and said event bus to decrement said stored associated event bus output interface down-counter value to a value of zero whereupon said down-counter generates an associated signal; and said event bus output interface further operated in response to said associated event bus output interface down-counter signal and to a match of said stored associated output enable bit pattern and said event bus to generate said associated monitor system output signal.

* * * * *